United States Patent
Harada et al.

(10) Patent No.: US 10,744,795 B2
(45) Date of Patent: Aug. 18, 2020

(54) LIQUID DISCHARGE SYSTEM, IMAGE FORMING APPARATUS, AND LIQUID DISCHARGE METHOD

(71) Applicants: Yoshihiro Harada, Kanagawa (JP); Takashi Tamai, Kanagawa (JP); Atsufumi Hanazawa, Tokyo (JP); Sayuri Kojima, Kanagawa (JP)

(72) Inventors: Yoshihiro Harada, Kanagawa (JP); Takashi Tamai, Kanagawa (JP); Atsufumi Hanazawa, Tokyo (JP); Sayuri Kojima, Kanagawa (JP)

(73) Assignee: Ricoh Company, Ltd., Tokyo ( * ) Notice: Subject to any disclaimer, the term of this patent is extended or adjusted under 35 U.S.C. 154(b) by 0 days.

(21) Appl. No.: 16/162,311

(22) Filed: Oct. 16, 2018

(65) Prior Publication Data

US 2019/0118557 A1 Apr. 25, 2019

(30) Foreign Application Priority Data

Oct. 24, 2017 (JP) .................................. 2017-205617
Jul. 26, 2018 (JP) .................................. 2018-140418

(51) Int. Cl.

| B41J 11/00 | (2006.01) |
|---|---|
| C09D 11/322 | (2014.01) |
| C09D 11/10 | (2014.01) |
| B41M 5/00 | (2006.01) |
| C09D 11/54 | (2014.01) |
| B41J 2/21 | (2006.01) |

(52) U.S. Cl.
CPC .......... *B41J 11/0015* (2013.01); *B41J 2/2114* (2013.01); *B41M 5/0011* (2013.01); *C09D 11/10* (2013.01); *C09D 11/322* (2013.01); *C09D 11/54* (2013.01); *B41M 5/0017* (2013.01)

(58) Field of Classification Search
CPC ........ B41J 2/2114; B41J 11/0015; B41J 2/01; B41M 5/0017; B41M 5/0011; C09D 11/322; C09D 11/54; C09D 11/10
See application file for complete search history.

(56) References Cited

U.S. PATENT DOCUMENTS

| 2007/0064026 A1 | 3/2007 | Hirakawa |
| 2009/0153613 A1 | 6/2009 | Yamanobe |
| 2014/0232783 A1* | 8/2014 | del Rio ................ B41J 11/0015 347/21 |

FOREIGN PATENT DOCUMENTS

| EP | 2234814 A1 | 10/2010 |
| JP | 2007-055017 | 3/2007 |
| JP | 2008-062503 | 3/2008 |
| JP | 2011-121335 | 6/2011 |
| WO | 2009019079 A1 | 7/2009 |
| WO | 2013050080 A1 | 4/2013 |

OTHER PUBLICATIONS

European Search Report; Application 18200851.6-1019; dated Feb. 21, 2019.

\* cited by examiner

*Primary Examiner* — Jannelle M Lebron
(74) *Attorney, Agent, or Firm* — Duft & Bornsen, PC

(57) ABSTRACT

A liquid discharge system includes a pretreatment execution device to perform pretreatment on a medium and a liquid discharge head to discharge liquid onto the medium based on image information on an image to be output. The liquid discharge system further includes circuitry configured to control a manner of the pretreatment based on the image information.

15 Claims, 19 Drawing Sheets

FIG. 12

| COLORANT/PRETREATMENT AGENT COMBINATION | | AGGREGATING AGENT CONCENTRATION | | | DOT STATE |
| --- | --- | --- | --- | --- | --- |
| | | LOW CONCENTRATION | MODERATE CONCENTRATION | HIGH CONCENTRATION | |
| (a) | COLORANT A / PRETREATMENT AGENT a | | | | DOT DIAMETER INCREASES / BECOME SPARSE |
| (b) | COLORANT A / PRETREATMENT AGENT b | | | | DOT DIAMETER DOES NOT CHANGE / BECOME SPARSE |
| (c) | COLORANT B / PRETREATMENT AGENT c | | | | DOT DIAMETER DECREASES / DISTRIBUTION DOES NOT CHANGE |
| (d) | COLORANT B / PRETREATMENT AGENT d | | | | DOT DIAMETER DECREASES / BECOME DENSE |
| ⋮ | ⋮ | | | | |

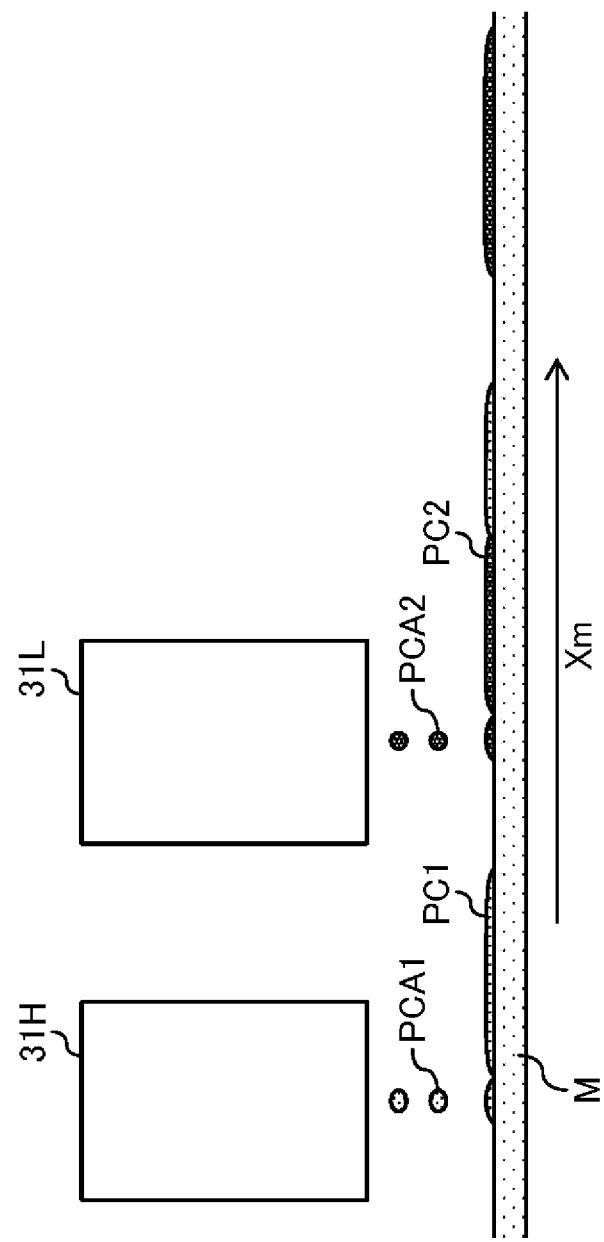

LIQUID DISCHARGE SYSTEM, IMAGE FORMING APPARATUS, AND LIQUID DISCHARGE METHOD

CROSS-REFERENCE TO RELATED APPLICATIONS

This patent application is based on and claims priority pursuant to 35 U.S.C. § 119(a) to Japanese Patent Application Nos. 2017-205617 filed on Oct. 24, 2017 and 2018-140418 filed on Jul. 26, 2018, in the Japan Patent Office, the entire disclosure of each of which is hereby incorporated by reference herein.

BACKGROUND

Technical Field

The present disclosure relates to a liquid discharge system, an image forming apparatus, and a liquid discharge method.

Description of the Related Art

A printer adopting an inkjet method (hereinafter referred to as "inkjet apparatus") is one of apparatuses used for outputting digitized or electronic information. In image formation and output (hereinafter also simply "image formation" or "image output"), which is one of information output modes of the inkjet apparatus, droplets of ink or the like used for forming an image are discharged from a recording head and applied to a recording medium (such as paper) to bear an image.

The amount of ink to be applied to the recording medium is controlled to set the size of the ink dot forming the image to a predetermined size. Such ink dots are applied to the recording medium so as to be aligned two-dimensionally, thereby forming an image. In the image formation using the inkjet method, ink dot size and arrangement density of ink dots are adjusted, to delicately express tone and gradation of an image.

In the inkjet method, there is a factor to degrade the quality of the image on the recording medium. That is, depending on the speed at which ink wetting spreads, as the ink applied to the recording medium flows on the recording medium, the ink dots spreading on the recording medium are coupled together, resulting in a phenomenon called beading. In addition, due to flow of ink, ink dots bleed, which is a phenomenon called bleeding. Such phenomena degrade the quality of the image on the recording medium.

SUMMARY

According to an embodiment, a liquid discharge system includes a pretreatment execution device to perform pretreatment on a medium; a liquid discharge head to discharge liquid onto the medium based on image information on an image to be output; and a circuitry configured to control a manner of the pretreatment based on the image information.

Another embodiment provides an image forming apparatus that includes a pretreatment execution device to perform pretreatment on a medium; a liquid discharge head to discharge liquid onto the medium based on image information on an image to be output; and a circuitry configured to control a manner of the pretreatment based on the image information.

Yet another embodiment provides a liquid discharge method that includes performing pretreatment on a medium; controlling a manner of the pretreatment based on image information on an image to be output; and discharging liquid onto the medium based on the image information.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 12 illustrates a characteristic data table according to Embodiment 1;

FIG. 14 is a side view illustrating a manner of discharge of droplets according to Embodiment 1;

Figure 1A:
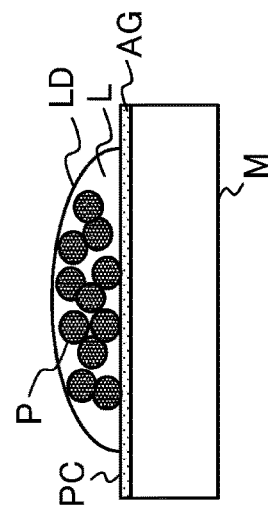
FIGS. 1A, 1B, and 1C are diagrams for explaining fluidity of an example droplet.

The accompanying drawings are intended to depict embodiments of the present invention and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views thereof, an inkjet system according to an embodiment of this disclosure is described. As used herein, the singular forms "a", "an", and "the" are intended to include the plural forms as well, unless the context clearly indicates otherwise.

In the embodiment described below, ink, which is an example image forming agent according to the present disclosure, is discharged onto a print sheet, which is an example recording medium, to form an image, which is an example image product. First, descriptions are given below of flowability of ink droplets as an example of behaviors of ink droplets discharged onto a recording medium such as the print sheet.

Figure 1B:
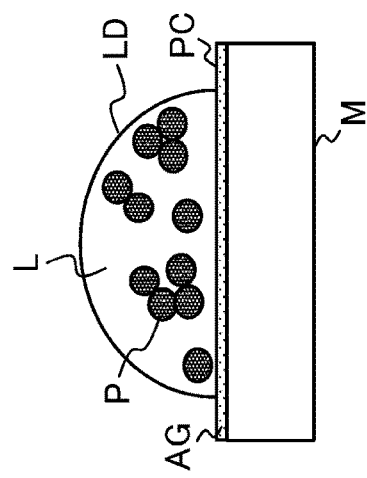
Figure 1C:
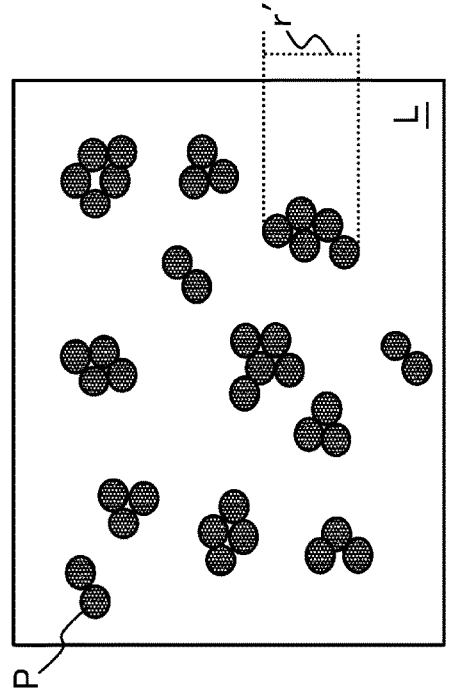

FIGS. 1A to 1C are diagrams for explaining the fluidity of a droplet LD relative to a recording medium M. The droplet LD is an ink droplet including pigment particles P (a colorant). FIG. 1A illustrates a state immediately before the droplet LD discharged comes into contact with the recording medium M (a print sheet). As illustrated in FIG. 1A, the droplet LD includes the pigment particles P and a solvent L.

In this example, the surface of the recording medium M is coated with an aggregating agent AG, which is a reactant for changing the dispersion state of the pigment particles P, thereby causing the pigment particles P to aggregate. The process of applying the aggregating agent AG on the surface of the recording medium M is called "pretreatment". The recording medium M is subjected to pretreatment in advance, before discharging the droplet LD onto the recording medium M. With the pretreatment, a pretreatment region PC (coated with the pretreatment agent) is formed on the surface of the recording medium M, onto which the droplet LD is discharged. For example, a pretreatment agent is applied to the recording medium to change the viscosity of the ink discharged on the recording medium. As the viscosity changes, the speed at which the wetting of the ink with respect to the recording medium increases. Thus, the behavior of the ink on the recording medium is controlled.

FIG. 1A is a diagram illustrating a dispersion state of the pigment particles P in the solvent L immediately before the droplet LD contacts the recording medium M. As illustrated in FIG. 1A, the droplet LD is formed in a state in which the pigment particles P are dispersed in the solvent L. In the case of a pigment ink containing a pigment as a colorant, the pigment particles P are uniformly dispersed in the solvent L such as a solvent or a resin.

FIG. 1B is a diagram illustrating a dispersion state of the pigment particles P in the solvent L at the moment when the droplet LD adheres to the recording medium M. As the droplet LD adheres to the recording medium M, the pigment particles P aggregate due to the aggregating agent AG contained in the pretreatment region PC, and the dispersion state of the pigment particles P in the solvent L becomes nonuniform.

Figure 2A:
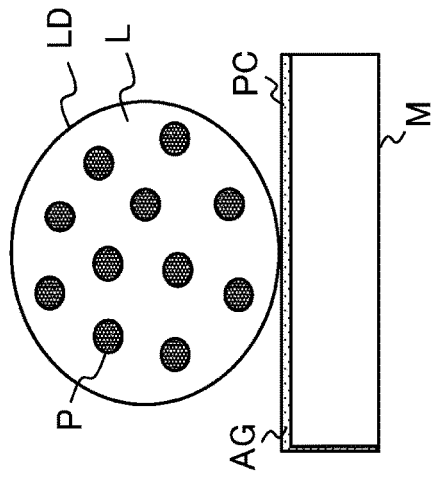
FIGS. 2A and 2B are diagrams illustrating example dispersion states of pigment particles in a solvent.
Figure 2B:
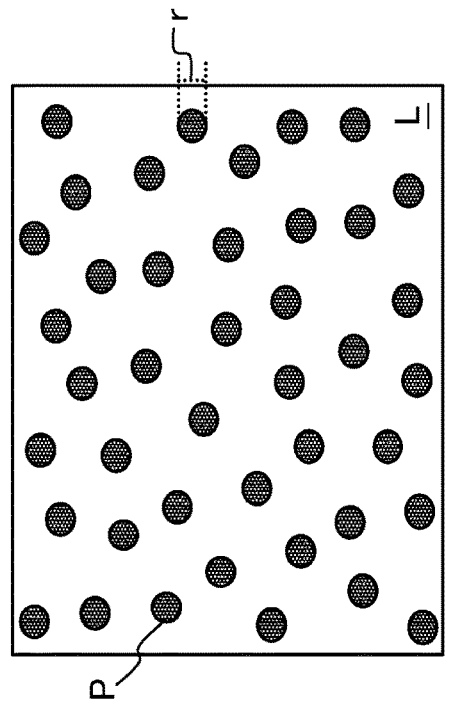

FIGS. 2A and 2B illustrate example dispersion states of the pigment particles P in the solvent L in the droplet LD. The following description is on the assumption that the droplet LD before adhering to the recording medium M is in a state illustrated in FIG. 2A, that is, the pigment particle P is uniformly dispersed in the solvent L. FIG. 2B illustrates a state in which the dispersion of the pigment particles P in the solvent L becomes nonuniform due to the effect of the pretreatment region PC on the recording medium M.

Referring to FIG. 2A, descriptions are given below of the size of the pigment particles P uniformly dispersed in the solvent L, assuming that the particle diameter is r. As the pigment particles P uniformly dispersed in the solvent L aggregate together as illustrated in FIG. 2B, an apparent particle diameter of the pigment particle P increases from the particle diameter r to a particle diameter r'. In addition, as the pigment particles P aggregate, the dispersion state of the pigment particles P in the solvent L becomes nonuniform.

The pigment particles P dispersed in the solvent L move at that time is expressed using a diffusion coefficient D. The diffusion coefficient D complies with the Stokes-Einstein equation (Equation 1). That is, the diffusion coefficient D is proportional to an absolute temperature T and inversely proportional to the size of the pigment particles P moving. The Stokes-Einstein equation is an equation expressing the diffusion state of the pigment particles P dispersed in the solvent L based on the relation between a viscosity η of the solvent L and the diffusion coefficient D.

$$D = \frac{k_E T}{6\pi \eta a} \qquad \text{Equation 1}$$

In Equation 1, D is the diffusion coefficient, η is the viscosity of the solvent L, T is the absolute temperature, kB is the Boltzmann constant, and a is the particle radius. As illustrated in Equation 1, as the size of the pigment particle P increases, the diffusion coefficient D decreases, and the degree of freedom of movement of the pigment particle P in the solvent L decreases. Therefore, when the pigment particles P aggregate, the droplets LD less easily flow.

Generally, the droplet LD adhering to the recording medium M flows and spreads to the periphery of the adhering point. Accordingly, when the droplet LD solidifies on the recording medium M, the size of the droplet LD increases from the moment the droplet LD contacts the recording medium M. However, as the flowability of the droplet LD decreases due to the aggregation of the pigment particles P as described above, the size of the droplet LD adhering to the recording medium M is less likely to change. Then, the size of the droplet LD at the time of solidification on the recording medium M decreases from the size of the droplet LD that easily flows. That is, the droplet LD is less likely to spread out from the adhering point.

FIG. 1C is a side view illustrating how the droplet LD permeates into the recording medium M. As illustrated in FIG. 1C, when the recording medium M is a permeable medium such as plain paper, the droplet LD permeates into the pretreatment agent region PC and the recording medium M. Then, the droplet LD hardens on the recording medium M. As the adhering droplet LD dries, a dot of the pigment particle P is formed on the recording medium M.

Figure 3A:
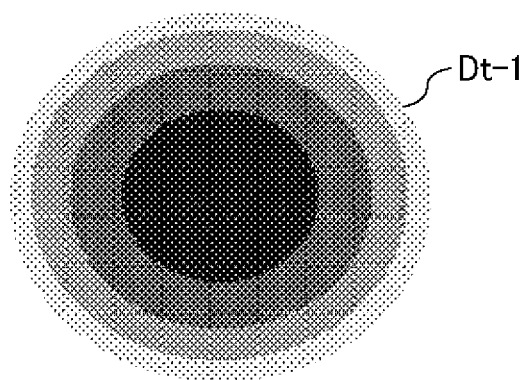
FIGS. 3A and 3B are views of example dots formed by droplets adhering to a recording medium.
Figure 3B:
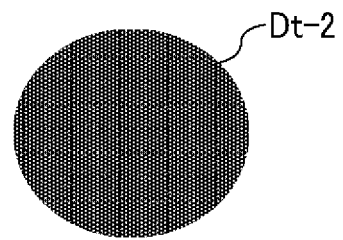

FIGS. 3A and 3B are diagrams respectively illustrating dots Dt-1 and Dt-2 (collectively "dot Dt") formed by the droplets LD adhering to the recording medium M. Note that the concentration of the aggregating agent AG in the pretreatment region PC in FIG. 3A is referred to as an aggregating agent concentration AGC1, the concentration of the aggregating agent AG in the pretreatment region PC in FIG. 3B is referred to as an aggregating agent concentration AGC2.

When the droplet LD permeates into the recording medium M, differences are caused in the dot Dt formed by adhesion of the droplet LD on the recording medium M and in the dispersion state of the pigment particles P in the dots Dt depending on the balance between ease of spreading of wetting of the droplet LD and degree of freedom of movement of the pigment particles P in the droplet LD. Specifically, the uniformity of the distribution concentration of the pigment particles P in the dots Dt differs as illustrated in FIGS. 3A and 3B.

FIG. 3A illustrates the dot Dt-1 of the pigment particles P formed on the recording medium M on which the pretreatment region PC is formed by the pretreatment agent PCA having the aggregating agent concentration AGC1. In the dot Dt-1, the distribution concentration of the pigment particles P decreases from the center of the dot toward the outer periphery.

FIG. 3B illustrates the dot Dt-2 of the pigment particles P formed on the recording medium M on which the pretreatment region PC is formed by the pretreatment agent PCA having the aggregating agent concentration AG2. In the dot Dt-2, the distribution concentration of the pigment particles P is constant irrespective of the position in the dot. As illustrated in FIGS. 3A and 3B, the dot Dt-1 is larger than the dot Dt-2. In other words, the dot Dt-2 is smaller in size than the dot Dt-1.

The aggregating agent concentration AGC in the pretreatment region PC is a factor for changing the speed of spreading of wetting of the droplets LD relative to the recording medium M. For example, the aggregating agent concentration AGC affects the contact angle of the droplets LD with respect to the recording medium M and the speed at which the aggregating agent AG diffuses into the solvent L in the droplet LD. Therefore, the difference in the uniformity of the distribution concentration of the pigment particles P is caused by the difference in the aggregating agent concentration AGC in the pretreatment region PC.

Since the contact angle of the droplet LD with the recording medium M varies depending on the aggregating agent concentration AGC, the area of contact between the droplet LD and the recording medium M also changes. At that time, the difference in the speed at which the wetting of the droplet LD spreads on the recording medium M, that is, the behavior of the droplet LD with respect to the recording medium M can be evaluated, for example, by wettability of the droplet LD. The wettability is an index indicating the adhesion state of the droplet LD to the recording medium M, with the magnitude of the contact angle of the droplet LD with the surface of the recording medium M.

In this evaluation, as the contact angle of the droplet LD with the recording medium M decreases, the wettability improves. Therefore, as the wettability improves, the contact area between the droplet LD and the recording medium M becomes larger, and the wetting of the droplet LD spreads more quickly on the recording medium M. Accordingly, the size of the dot Dt formed on the recording medium M increases.

On the other hand, as the wettability lowers, the contact area between the droplet LD and the recording medium M decreases, and the wetting of the droplet LD spreads more slowly on the recording medium M. Accordingly, the size of the dot Dt formed on the recording medium M decreases.

Thus, when the aggregating agent concentration AGC in the pretreatment region PC is different, the degree of aggregation of the pigment particles P in the droplet LD varies. Therefore, the behavior of the droplet LD on the recording medium M varies. Therefore, depending on the aggregating agent concentration AGC in the pretreatment region PC, the difference is caused in the uniformity of the distribution concentration of the pigment particles P of the dots Dt formed by the droplets LD. Such a phenomenon varies depending on the combination of the properties of a material contained in the droplet LD and the property of a material contained in the pretreatment region PC.

Even when the size of the droplet LD adhering to the recording medium M changes, similarly, the aggregating agent concentration AGC in the pretreatment region PC causes the difference in the uniformity of the distribution concentration of the pigment particle P in the dot Dt.

The quality (image quality) of the image formed on the recording medium M with the droplet LD discharged thereto can deteriorate due to the difference in the distribution concentration of the pigment particle P in the dot Dt caused by changes in the behavior of the droplet LD. For example, in formation of an image including characters or thin lines on the recording medium M, if the size of the dot Dt is large and the distribution concentration of the pigment particles P in the dot Dt is not constant, the characters and lines may be blurred on the recording medium M.

On the other hand, in formation of an image including a photograph or the like on the recording medium M, if the size of the dot Dt is small and the distribution concentration of the pigment particle P in the dot Dt is constant, the graininess (granular quality) of the image formed on the recording medium M may be undesirably conspicuous. For example, when a letter or a fine line is blurred or a graininess is conspicuous in an image including a photograph or the like, the quality of the image is low.

Therefore, in the present disclosure, the behavior of the droplet LD adhering to the recording medium M is controlled. Specifically, the recording medium M is pretreated for controlling the behavior of the droplet LD based on the type of the image to be formed and output. In other words, the manner of the pretreatment is controlled based on the type of the image output, to control the behavior of the droplet LD with respect to the recording medium M. Such control contributes output of good quality images.

Image types include, for example, text (letter) and photograph. Image types can further include table. In the present disclosure, controlling the manner of the pretreatment includes, for example, changing the amount of the pretreatment agent applied to the recording medium M and changing the concentration (e.g., the aggregating agent concentration ACG) of the pretreatment agent applied to the recording medium M. The control method will be described in detail later.

Embodiment 1

In the present embodiment, descriptions are given of, as an example, a line head inkjet apparatus that discharges liquid droplets from a stationary discharge head onto a recording medium, for image output, while conveying the recording medium.

Figure 4:
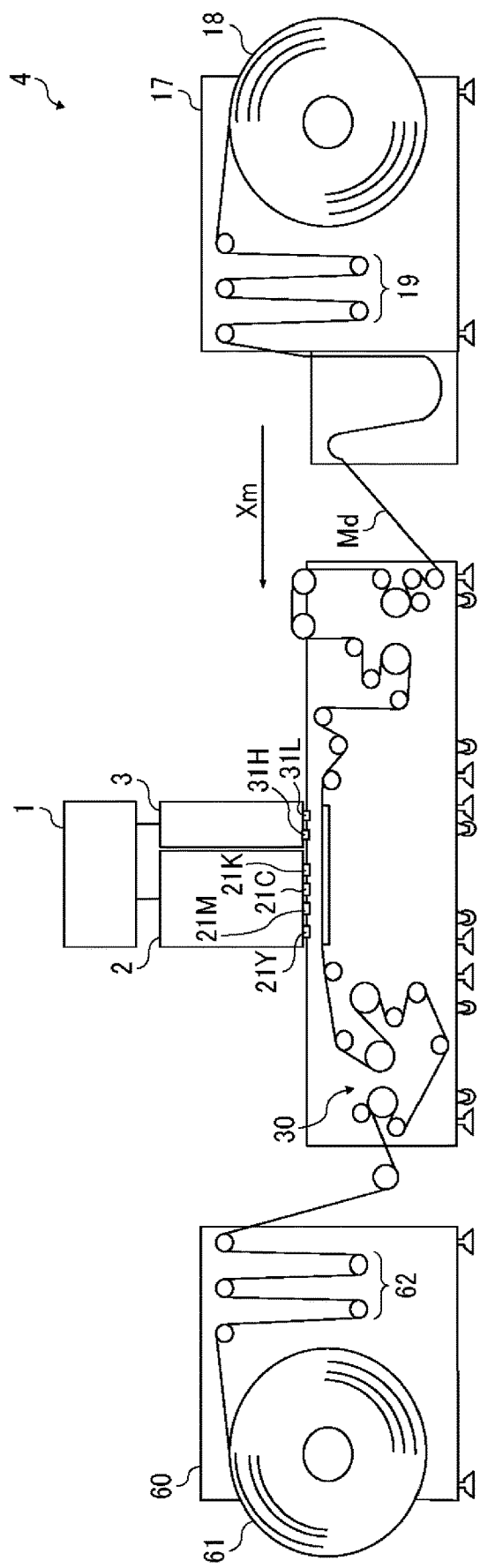
FIG. 4 is a schematic side view of an inkjet system according to Embodiment 1.

FIG. 4 is a schematic side view of an inkjet system 4 according to the present embodiment. As illustrated in FIG. 4, the inkjet system 4 according to the present embodiment includes a digital front end (DFE) 1, an inkjet apparatus 2, a pretreatment apparatus 3, a carrying-in unit 17 arranged along the direction, indicated by arrow Xm, of conveyance of a rolled sheet Md, that is, the recording medium M, (herein after "conveyance direction Xm), a drying unit 30, and a discharge unit 60.

The DFE 1 transmits command information to each unit of the inkjet system 4 and controls the operation to execute image formation and output. Therefore, the DFE 1 functions as an image formation and output controller. In addition, the DFE 1 executes a raster image processor (RIP) processing based on information of images to be output and generates raster data.

The DFE 1 uses the raster data, bitmap data input to the DFE 1, or the like to cause the inkjet apparatus 2 and the pretreatment apparatus 3 to perform image formation. Therefore, the bitmap data input to the DFE 1 and the raster data generated by the DFE 1 correspond to the drawing data referred to by the inkjet apparatus 2 and the pretreatment apparatus 3 when executing the image formation. As will be described later, the drawing data is a part of image formation information for controlling the operation of the pretreatment apparatus 3 and the operation of the inkjet apparatus 2.

The inkjet apparatus 2 is a liquid discharge apparatus that includes four colorant discharge heads 21K, 21C, 21M, and 21Y (also collectively "colorant discharge heads 21") for black (K), cyan (C), magenta (M), and yellow (Y). In the following description, colors of liquid droplets LD discharged from the colorant discharge head 21 21 (i.e., liquid discharge heads) may be indicated using references in parentheses presented above.

The description of the present embodiment below is on the assumption that coloring liquid droplets, such as ink containing the pigment particles P, are discharged as colorants from the inkjet apparatus 2. Therefore, the colorant discharge head 21 functions as a liquid discharge unit.

The pretreatment apparatus 3 is a liquid discharge apparatus including pretreatment agent discharge heads 31H and 31L to discharge an aggregating agent AG having a property of changing the dispersion state of the pigment particles P. The pretreatment agent discharge head 31H discharges droplets of a pretreatment agent AGH (first treatment liquid droplet) having a higher concentration of the aggregating agent AG. The pretreatment agent discharge head 31H functions as a first liquid discharge unit. The pretreatment agent discharge heads 31H and 31L (collectively "pretreatment agent discharge heads 31") function as pretreatment execution units.

The pretreatment agent discharge head 31L discharges droplets LD of a pretreatment agent AGL (second treatment liquid droplet) in which the concentration of the aggregating agent AG is lower than the concentration of the pretreatment agent AGH discharged from the pretreatment agent discharge head 31H. The pretreatment agent discharge head 31L functions as a second liquid discharge unit. The pretreatment agent discharge heads 31H and 31L function as a treatment liquid discharge unit to discharge the pretreatment agent AGL as treatment liquid droplets.

In the present embodiment, the recording medium M is a continuous sheet (hereinafter referred to as "rolled sheet Md") wound in a roll. Alternatively, a continuous sheet that is not rolled can be used. For example, a continuous sheet or a continuous form sheet provided with stitch perforations at regular intervals can be used. Yet alternatively, the recording medium M can be a cut sheet of a regular size. Further, the recording medium M is not necessarily a paper sheet but can be film.

The carrying-in unit 17 includes a sheet feeder 18 and a plurality of carrying-side conveyance rollers 19. The carrying-in unit 17 carries the rolled sheet Md from the sheet feeder 18 into the pretreatment apparatus 3 using the carrying-side conveyance rollers 19. The pretreatment apparatus 3 discharges the droplet LD containing the aggregating agent AG onto the rolled sheet Md transported from the carrying-in unit 17, to form the pretreatment region PC on the surface of the rolled sheet Md.

The inkjet apparatus 2 discharges a droplet containing a colorant (e.g., a pigment or a dye) onto the rolled sheet Md bearing the pretreatment region PC, to form an image on the surface of the rolled sheet Md. The drying unit 30 dries the rolled sheet Md on which an image is formed, for example, by heating. The discharge unit 60 unloads the rolled sheet Md bearing the image from the drying unit 30 and winds the rolled sheet Md around a storing roll of a storage portion 61 using discharge-side conveyance rollers 62.

In a configuration that applies a relatively large pressure on the rolled sheet Md being wound around the storing roll of the storage portion 61, a dryer can be provided to dry the rolled sheet Md immediately before being wound in the storage portion 61, to prevent transfer of an image onto the back side of the rolled sheet Md.

As described above, in the inkjet system 4 according to the present embodiment, the carrying-in unit 17 conveys the rolled sheet Md to the pretreatment apparatus 3 and the inkjet apparatus 2, and the inkjet apparatus 2 forms an image on the surface of the rolled sheet Md. Then, the drying unit 30 dries the rolled sheet Md on which the image is formed, and the discharge unit 60 reels in the rolled sheet Md so that the rolled sheet Md can be carried out the inkjet system 4.

Figure 5:
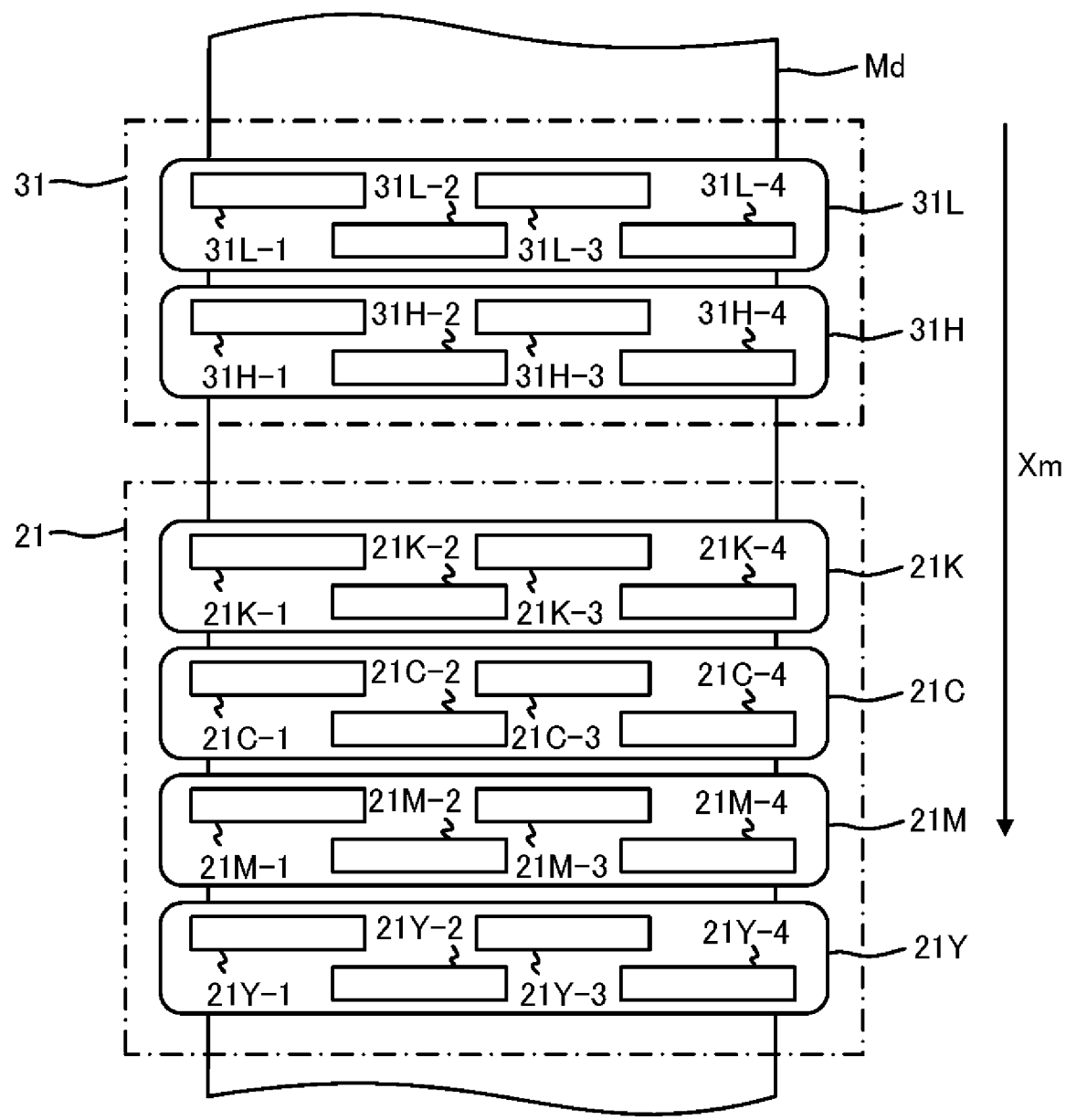
FIG. 5 is a plan view of a discharge head according to Embodiment 1.

Next, with reference to FIG. 5, descriptions are given below of the configuration of the discharge head that discharges the droplet LD according to the present embodiment. As illustrated in FIG. 5, the inkjet system 4 includes the pretreatment agent discharge heads 31H and 31L and the colorant discharge heads 21K, 21C, 21M and 21Y. The pretreatment agent discharge heads 31H and 31L are disposed on the upstream side in the conveyance direction Xm of the rolled sheet Md, and the colorant discharge heads 21K, 21C, 21M and 21Y are disposed downstream from the pretreatment agent discharge heads 31H and 31L in the conveyance direction Xm.

That is, while conveying the rolled sheet Md, the inkjet system 4 applies a treatment agent, as pretreatment, to an image formation position on the rolled sheet Md on the upstream side in the conveyance direction Xm. The rolled sheet Md is one example of media on which images are formed. To a pretreated region of the rolled sheet Md coated with the treatment agent, a colorant is applied, thereby forming an image.

Although the discharge heads are arranged in the order of black (K), cyan (C), magenta (M), and yellow (Y) in the present embodiment, embodiments of the present disclosure are not limited to thereto. For example, the colors can be arranged in the order of Y, M, C, and K. Further, the color combination is not limited to K, C, M and Y. For example, a combination of three colors such as green (G), red (R), and light cyan (LC) can be adopted. Further, one color, that is, black (K), not a color combination, can be adopted.

In the colorant discharge head 21K, a first head 21K-1, a second head 21K-2, a third head 21K-3, and a fourth head 21K-4 are arranged in a zigzag manner in a direction orthogonal to the conveyance direction Xm.

In the inkjet apparatus 2, the zigzag arrangement of the first head 21K-1, the second head 21K-2, the third head 21K-3, and the fourth head 21K-4 is advantageous in performing image formation on the recording medium M in a width direction of an image formation area, that is, in a region orthogonal to the conveyance direction Xm in which the rolled sheet Md is conveyed.

The colorant discharge head 21C includes first, second, third, and fourth heads 21C-1, 21C-2, 21C-3, and 21C-4. The colorant discharge head 21M includes first, second, third, and fourth heads 21M-1, 21M-2, 21M-3, and 21M-4. The colorant discharge head 21Y includes first, second, third, and fourth heads 21Y-1, 21Y-2, 21Y-3, and 21Y-4. The pretreatment agent discharge heads 31H includes first, second, third, and fourth heads 31H-1, 31H-2, 31H-3, and 31H-4. The pretreatment agent discharge heads 31L includes first, second, third, and fourth heads 31L-1, 31L-2, 31L-3, and 31L-4. Since the colorant discharge heads 21C, 21M, and 21Y and the pretreatment agent discharge heads 31H and 31L are similar in structure to the colorant discharge head 21K, redundant descriptions are omitted.

Figure 6:
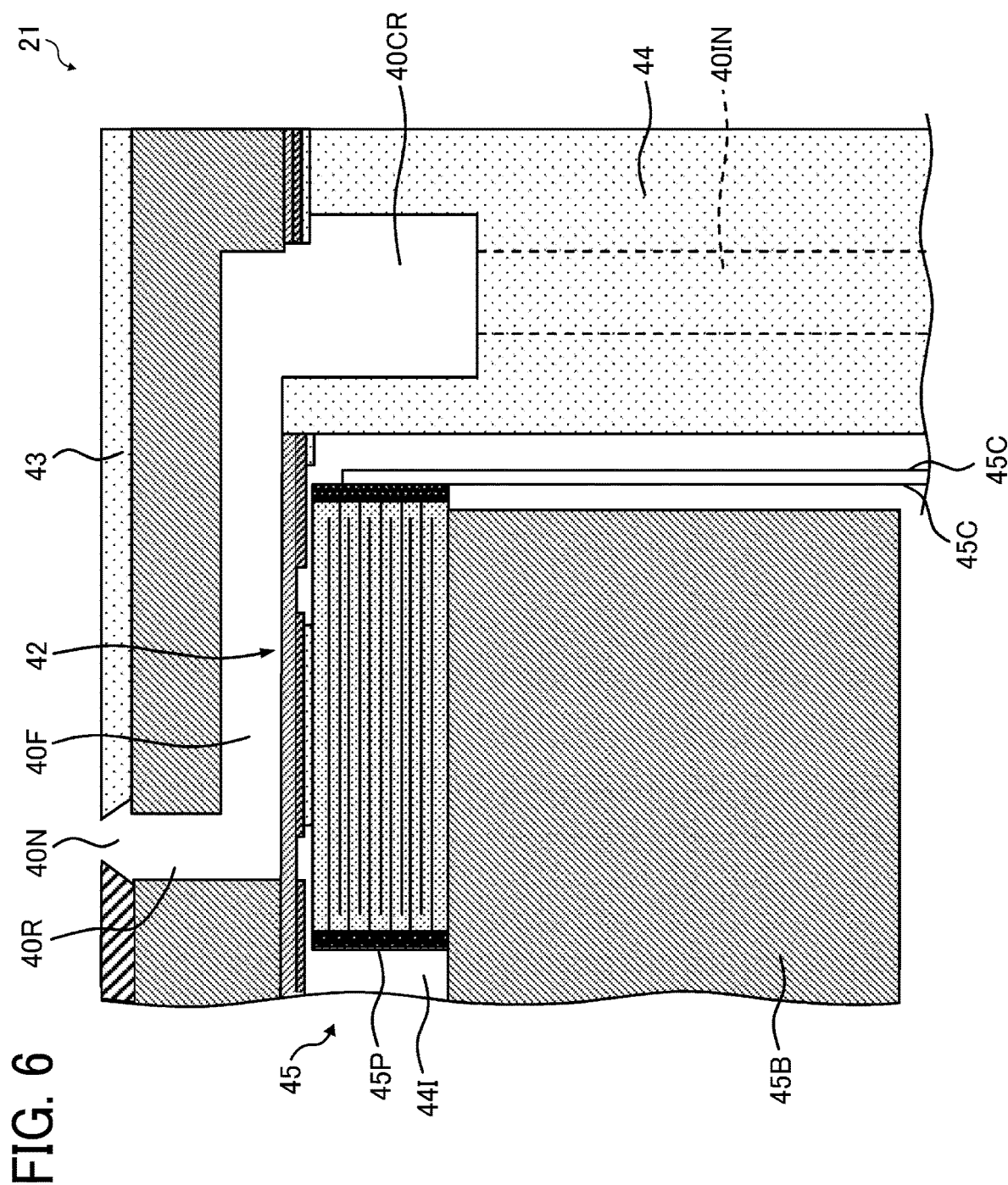
FIG. 6 is a schematic view of a colorant discharge head according to Embodiment 1.

FIG. 6 is a cross-sectional view illustrating a schematic configuration of the colorant discharge head 21K. The colorant discharge head 21K includes a channel substrate 41, a vibration plate 42, a nozzle plate 43, a frame 44, and a pressure generator 45. The channel substrate 41 defines a passage of the droplet LD to be discharged. The channel substrate 41 is made of a single crystal silicon substrate having a crystal plane orientation (110), for example.

The channel substrate 41 includes a nozzle communication channel 40R and a liquid chamber 40F, which are formed by anisotropic etching using an alkaline etching solution such as a potassium hydroxide (KOH) solution. The material of the channel substrate 41 is not limited to a single crystal silicon substrate. For example, stainless steel, photosensitive resin, and other materials can be used as the material of the channel substrate 41.

The vibration plate 42 is made of, for example, a metal plate processed by electroforming such as nickel electroforming. Alternatively, the vibration plate 42 can be a plate of metal other than nickel, a plate made from joining a metal part and a resin plate, or the like. The vibration plate 42 is bonded to a lower face of the channel substrate 41, that is, on an inner side of the colorant discharge head 21K. The vibration plate 42 deforms by forced applied by the pressure generator 45.

The nozzle plate 43 is made of, for example, a single crystal silicon substrate. The nozzle plate 43 is processed by anisotropic etching similar to the channel substrate 41. Alternatively, the nozzle plate 43 can have a structure in which a water repellent layer is formed, via a required layer, on an outer face of a metal member. The nozzle plate 43 is joined to an upper face of the channel substrate 41, that is, on an outer side of the colorant discharge head 21K.

The nozzle plate 43 further includes a plurality of nozzles 40N to discharge the droplets LD. More specifically, the nozzles 40N each having a diameter of 10 μm to 30 μm is formed in the nozzle plate 43 corresponding to each liquid chamber 40F.

The frame 44 is made of thermosetting resin such as epoxy resin or polyphenylene sulfite (PPS). In addition, a resin having similar characteristics can be used as the material of the frame 44. The frame 44 includes a housing portion 441 to accommodate the pressure generator 45, a recessed portion serving as a common liquid chamber 40CR, and an ink supply port 401N for supplying ink from outside the colorant discharge head 21 to the common liquid chamber 40CR. The frame 44 is processed by injection molding. The frame 44 holds a peripheral portion of the vibration plate 42.

The pressure generator 45 includes piezoelectric elements 45P, a base substrate 45B for joining and securing the piezoelectric elements 45P, and a support disposed in a gap between the adjacent piezoelectric elements 45P. Further, a flexible printed circuits (FPC) cable 45C that couples the piezoelectric elements 45P to a drive circuit is coupled to the pressure generator 45.

As the piezoelectric element 45P, for example, a laminated piezoelectric element, made of lead zirconate titanate (PZT), in which a piezoelectric material and an internal electrode are alternately laminated is used. The internal electrode includes a plurality of individual electrodes and a plurality of common electrodes, and the individual electrodes or the common electrodes are alternately coupled to an end face of the piezoelectric element 45P.

The piezoelectric direction of the piezoelectric element 45P is, for example, a direction in which a crystal body becomes longer (hereinafter referred to as "d33 mode") when an electric field is applied, parallel to a polarization direction, to the crystal body of the piezoelectric element 45P. The pressure generator 45 pressurizes or depressurizes the ink in the liquid chamber 40F using a piezoelectric effect in the d33 mode of the piezoelectric element 45P.

Alternatively, the piezoelectric direction of the piezoelectric element 45P can be as follow. When an electric field is applied, parallel to the polarization direction, to the crystal body of the piezoelectric element 45P, the ink in the liquid chamber 40F is pressurized or depressurized in the d31 mode, which is the direction in which the crystal body is shortened. In addition, in the pressure generator 45, one row of piezoelectric elements can be arranged for one nozzle 40N that is an ink discharge port.

The support disposed between the piezoelectric elements 45P can be formed simultaneously with the piezoelectric element 45P by dividing the piezoelectric elements 45P (piezoelectric element members). That is, the colorant discharge head 21K can use the piezoelectric element 45P to which voltage is not applied as a support portion. The colorant discharge heads 21K, 21C, 21M, and 21Y and the pretreatment agent discharge heads 31H and 31L are similar in structure, and redundant descriptions are omitted.

Figure 7:
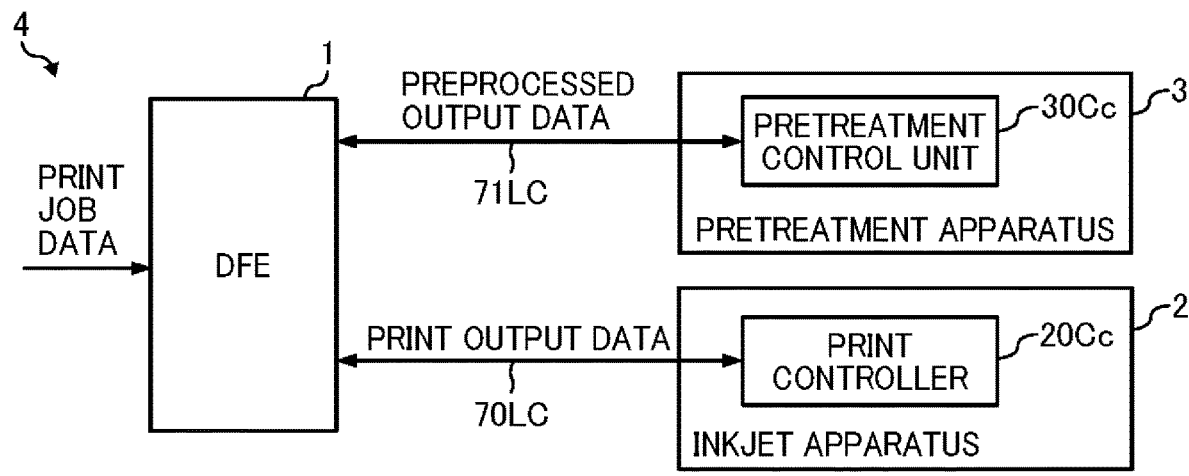
FIG. 7 is a block diagram illustrating a manner of operation of the inkjet system according to Embodiment 1.

Next, descriptions are given below of an operation of the colorant discharge head 21K to discharge droplets LD from the nozzle 40N, which in the present embodiment is pull discharge or push discharge. FIG. 7 is a block diagram illustrating an operation of the inkjet system 4 according to the present embodiment.

As illustrated in FIG. 7, the DFE 1 according to the present embodiment gives the components of the inkjet system 4 instructions on operation and controls the operation thereof. Then, the pretreatment apparatus 3 executes pretreatment to discharge the pretreatment agent PCA to the rolled sheet Md. In addition, the inkjet apparatus 2 discharges droplets LD containing a colorant onto the pretreated rolled sheet Md to form an image. The DFE 1 and the inkjet apparatus 2 are communicably connected by a signal line 70LC, and the DFE 1 and the pretreatment apparatus 3 are communicably connected by a signal line 71LC.

The inkjet apparatus 2 illustrated in FIG. 7 includes a print controller 20Cc to lower the voltage applied to the piezoelectric element 45P from a reference potential to cause the piezoelectric element 45P to contract in the direction of lamination, thereby deforming the vibration plate 42 to bend. The position of the vibration plate 42 before lowering the voltage is referred to as an initial position. As the vibration plate 42 deforms to bend, the volume of the liquid chamber 40F increases. As a result, the droplet LD flows into the liquid chamber 40F from the common liquid chamber 40CR.

Next, the print controller 20Cc increases the voltage applied to the piezoelectric element 45P to cause the piezoelectric element 45P to expand in the direction of lamination, thereby deforming the vibration plate 42 toward the nozzle 40N. As the vibration plate 42 thus deforms, the volume of the liquid chamber 40F decreases. As a result, pressure is applied to the droplets LD in the liquid chamber 40F, and the droplet LD is discharged from the nozzle 40N.

Then, the print controller 20Cc returns the voltage applied to the piezoelectric element 45P to the reference potential and returns the vibration plate 42 to the position before lowering the reference voltage, that is, to the initial position. In the colorant discharge head 21K, as the liquid chamber 40F expands, the interior of the liquid chamber 40F is depressurized, and the liquid chamber 40F is filled with the droplet LD flowing from the common liquid chamber 40CR. Then, the vibration of the meniscus of the nozzle 40N is attenuated, after which the operation is shifted to the discharge of a next droplet LD. In this manner, the discharge of the droplet LD is repeated.

Note that the driving method of the colorant discharge head 21K is not limited to the above-described pull discharge or push discharge. Alternatively, the voltage applied to the piezoelectric element 45P (hereinafter referred to as "drive waveform") can be adjusted to perform pull discharge or push discharge. Since the discharge heads of each of the colorant discharge heads 21K, 21C, 21M and 21Y are similar in configuration, redundant description will be omitted.

Further, the pretreatment apparatus 3 includes a pretreatment control unit 30Cc illustrated in FIG. 7 to control the pretreatment agent discharge heads 31H and 31L in a manner similar to the operation of the print controller 20Cc, to discharge the droplets LD onto the rolled sheet Md for pretreatment.

Note that the pressure generator 45 in the present embodiment is not limited to the piezoelectric element 45P. Alternatively, for example, a thermal pressure generator, an electrostatic pressure generator, or the like can be adopted. The thermal pressure generator employs a heat element (heating resistor) to heat droplets LD in the liquid chamber 40F for generating bubbles. The electrostatic pressure generator employs a vibration plate and an electrode disposed on the walls of the liquid chamber 40F so as to face each other, to generate an electrostatic force between the vibration plate and the electrode for deforming the vibration plate.

Using the colorant discharge heads 21K, 21C, 21M, and 21Y and the pretreatment agent discharge heads 31H and 31L described above, the inkjet system 4 according to the present embodiment can form a full-color or monochrome image entirely in the cross direction of the image formation area on the rolled sheet Md.

Figure 8:
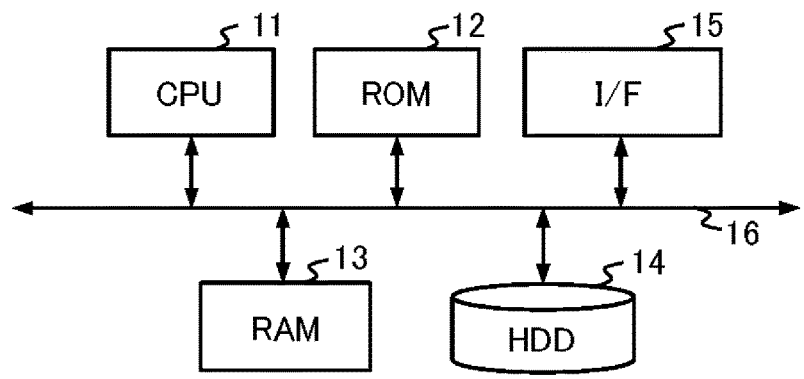
FIG. 8 is a block diagram illustrating a hardware configuration of a digital front end (DFE) according to Embodiment 1.

Next, a hardware configuration of the DFE 1 according to the present embodiment is described. As illustrated in FIG. 8, the DFE 1 includes a central processing unit (CPU) 11, a read only memory (ROM) 12, and a random access memory (RAM) 13. The DFE 1 further includes a hard disk drive (HDD) 14 and an interface (I/F) 15. Devices such as the CPU 11 constructing the DFE 1 are mutually connected by a bus 16.

The CPU 11 controls the operation of the entire DFE 1. The CPU 11 loads a program stored in the ROM 12 or the HDD 14 into the RAM 13 and executes the program, to control the operation of the DFE 1. In the ROM 12 and the HDD 14, a control program for controlling the CPU 11 is stored. The RAM 13 is used as a work area for expanding the program used by the CPU 11 or intermediate data.

The I/F 15 is used for communication between the DFE 1 and an external device such as a host device and performs communication corresponding to a protocol such as transmission control protocol/internet protocol (TCP/IP).

Further, the I/F 15 can be configured to communicate by, for example, Peripheral Component Interconnect Express (PCI Express), Industry Standard Architecture (ISA), or the like. In addition, the I/F 15 can be configured to have a plurality of channels corresponding to respective colors of print image data.

The DFE 1 receives print job data transmitted from an external device such as a host device via the I/F 15 under the control of the CPU 11 and stores the print job data in the HDD 14. Based on the job data received from the host device such as a personal computer (PC), the DFE 1 generates raster data which is information of an image such as bitmap data corresponding to each of cyan, magenta, yellow, and black, and generates information including raster data (hereinafter referred to as "print output data") to the inkjet apparatus 2. The inkjet apparatus 2 discharges droplets LD to the rolled sheet Md based on the print output data.

In addition, the DFE 1 generates data for controlling the print operation (hereinafter referred to as "control information data") based on the print job data and the information input from the host device. The control information data includes information on the manner of printing, print type, information on sheet feeding and sheet ejection, print side sequence, print sheet size, data size of print image data, resolution, sheet type information, gradation, color information, and print setting such as the number of pages to be printed.

The control information data can further include data concerning discharge of a post-treatment liquid discharged by a post-processing apparatus. The print output data is transmitted from the DFE 1 to the inkjet apparatus 2 and the pretreatment apparatus 3.

In the present embodiment, as one example, the DFE 1 analyzes the raster data to acquire data on the discharge of the droplets LD discharged by the pretreatment apparatus 3 (hereinafter referred to as "pretreatment output data") based on the analysis result and transmits the data on the discharge to the pretreatment apparatus 3.

Figure 9:
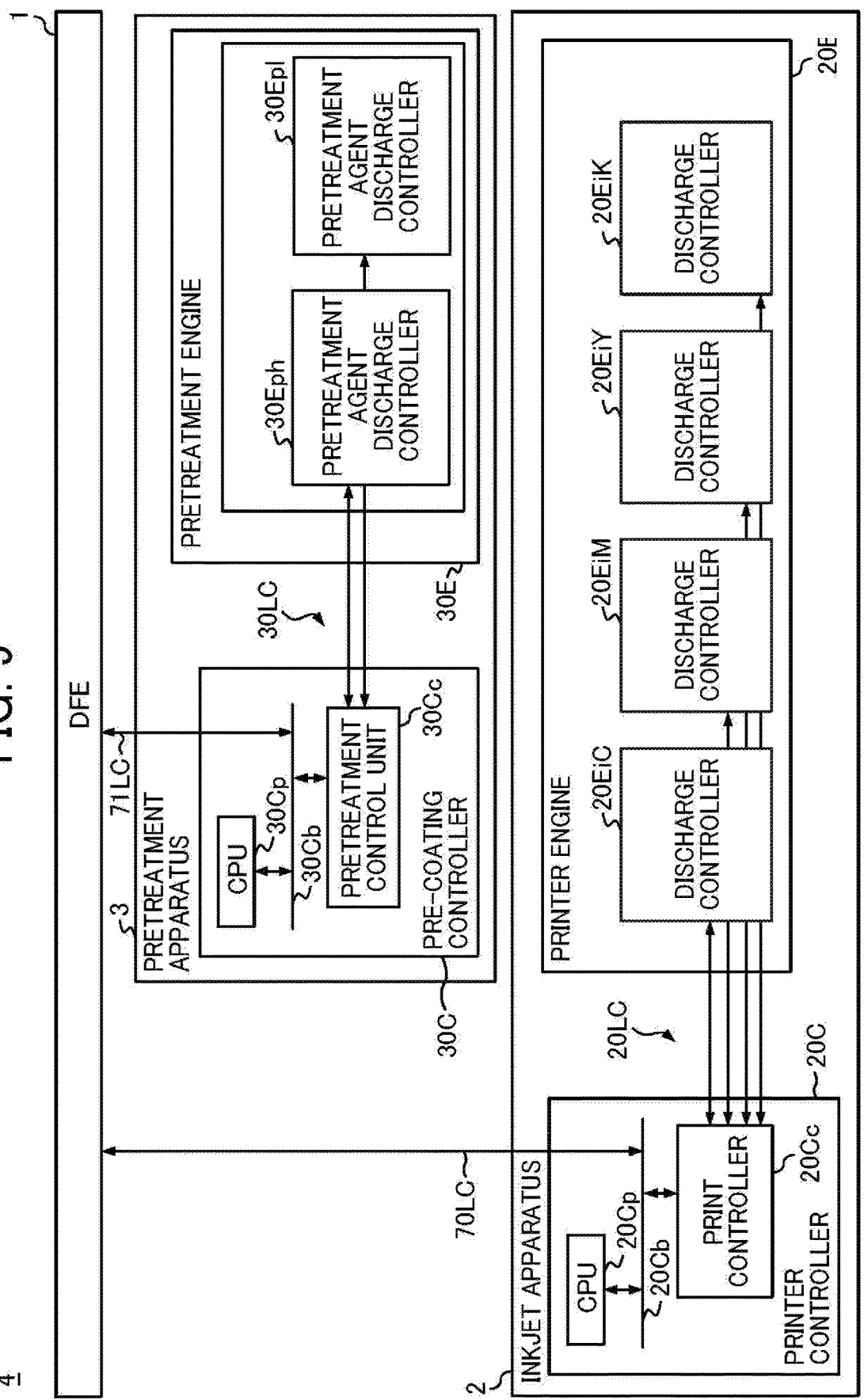
FIG. 9 is a functional block diagram of an inkjet apparatus and a pretreatment apparatus of the inkjet system according to Embodiment 1.

FIG. 9 is a functional block diagram of the inkjet apparatus 2 and the pretreatment apparatus 3 according to the present embodiment. The inkjet apparatus 2 controls the operation of image formation on the rolled sheet Md based on the print output data and the control information data input from the DFE 1. The inkjet apparatus 2 includes a printer controller 20C and a printer engine 20E.

The printer controller 20C includes a CPU 20Cp and the print controller 20Cc, and the CPU 20Cp and the print controller 20Cc are connected by a bus 20Cb to transmit and receive data therebetween. The bus 20Cb is connected to the signal line 70LC via a communication I/F. The CPU 20Cp uses the control program stored in the ROM to control the operation of the entire inkjet apparatus 2.

The print controller 20Cc transmits and receives information such as commands, parameters, and data to and from the printer engine 20E based on the control information data transmitted from the DFE 1. The print controller 20Cc exchanges information with the printer engine 20E, thereby controlling the printer engine 20E.

The printer controller 20C governs operation of the printer engine 20E. The printer controller 20C transmits and receives the control information data and the like to and from the DFE 1 via a signal line 20LC. The printer controller 20C transmits and receives the control information data and the like to and from the printer engine 20E to be described later via the signal line 20LC.

The printer controller 20C writes, in the register of the print controller 20Cc, print setting and the like included in the control information data transmitted and received, to store the print setting in the register. The printer controller 20C then controls the printer engine 20E according to the control information data to form an image based on the print job data and the control information data.

The printer engine 20E includes discharge controllers 20EiC, 20EiM, 20EiY, and 20EiK. The discharge controllers 20EiC, 20EiM, 20EiY, and 20EiK discharge the droplet LD on the rolled sheet Md according to the print output data transmitted from the print controller 20Cc to the colorant discharge heads 21C, 21M, 21Y and 21K, respectively, thus performing image formation.

Based on an instruction from the printer controller 20C, the printer engine 20E converts the bitmap data input from the DFE 1 to the inkjet apparatus 2 into data corresponding to the image formation and divides the data into data for each of the colorant discharge heads 21C, 21M, 21Y, and 21K.

For example, the printer engine 20E converts the 256-bit bitmap data into four values of large droplet, medium droplet, small droplet, and no discharge and divides the data into corresponding data for each of the colorant discharge heads 21C, 21M, 21Y and 21K.

The pretreatment apparatus 3 controls operation for forming the pretreatment region, which includes discharge of droplets LD of pretreatment agent onto the rolled sheet Md based on the pretreatment output data and the control information data input from the DFE 1. The pretreatment apparatus 3 includes a pre-coating controller 30C and a pretreatment engine 30E (pre-coating engine).

The pre-coating controller 30C according to the present embodiment includes a CPU 30Cp and the pretreatment control unit 30Cc, which are connected to each other by a bus 30Cb to transmit and receive data therebetween. The bus 30Cb is connected to the signal line 71LC via a communication I/F. The CPU 30Cp controls the overall operation of the pretreatment apparatus 3, using the control program stored in the ROM.

Based on the control information data transmitted from the DFE 1, the pretreatment control unit 30Cc transmits and receives information such as commands, parameters, and data to and from the pretreatment engine 30E. The pretreatment control unit 30Cc transmits and receives information to and from the pretreatment engine 30E, thereby controlling the pretreatment engine 30E.

The pre-coating controller 30C controls the pretreatment engine 30E. The pre-coating controller 30C exchanges data such as the pretreatment execution data with the DFE 1 via a signal line 30LC. The pre-coating controller 30C exchanges data such as the pretreatment execution data with the pretreatment engine 30E to be described later via the signal line 30LC.

The pre-coating controller 30C writes, in the register of the pretreatment control unit 30Cc, the print setting and the like included in the control information data and stores the print setting in the register. The pre-coating controller 30C controls the pretreatment engine 30E based on the control information data and causes the pretreatment execution unit to execute pretreatment according to pretreatment execution data. The pretreatment execution data will be described later.

The pretreatment engine 30E includes pretreatment agent discharge controllers 30Eph and 30Epl. Based on an instruction from the pre-coating controller 30C, the pretreatment engine 30E converts the bitmap data input from the DFE 1 to the pretreatment apparatus 3 into small value data corresponding to the image formation and divides the data into data for each of the pretreatment agent discharge controllers 30Eph and 30Epl.

For example, the pretreatment engine 30E converts the 256-bit bitmap data into four values of large droplet, medium droplet, small droplet, and no discharge and divides the data into corresponding data for each of the pretreatment agent discharge controllers 30Eph and 30Epl. The pretreatment agent discharge controllers 30Eph and 30Epl respectively cause the pretreatment agent discharge heads 31H and 31L to discharge the droplets LD on the rolled sheet Md based on the pretreatment output data transmitted from the pretreatment control unit 30Cc, thereby forming the pretreatment region PC on the rolled sheet Md. In the case where the pretreatment agent discharge heads 31H and 31L do not discharge different kinds of droplets such as large droplets, medium droplets, small droplets, etc., the printer engine 20E can be configured not to convert the data into four values.

As described above, in the inkjet system 4 according to the present embodiment, according to the drawing data input from the DFE 1, the inkjet apparatus 2 discharges liquid droplets onto the rolled sheet Md that has been pretreated by the pretreatment apparatus 3, thereby executing image formation. Next, a functional configuration of the DFE 1 according to the present embodiment is described with reference to FIG. 10.

Figure 10:
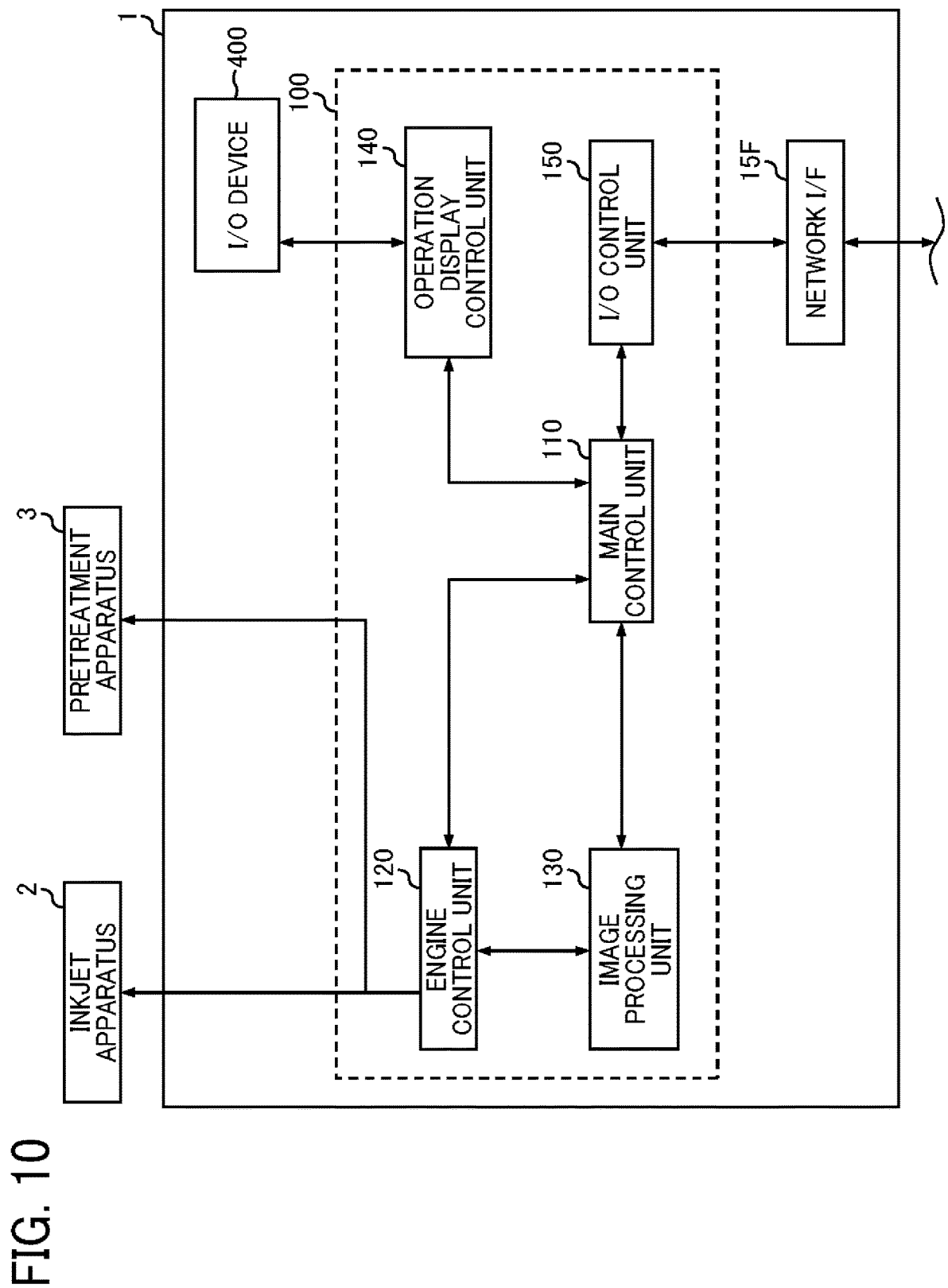
FIG. 10 is a block diagram illustrating a functional configuration of the DFE according to Embodiment 1.

As illustrated in FIG. 10, the DFE 1 includes a controller 100, an input and output (I/O) device 400, and a network I/F 15F. The input and output device 400 serves as both of an output interface to visually display the state of the DFE 1 and an input interface, such as a touch panel, for users to directly operate the DFE 1 or input information into the DFE 1.

That is, the input and output device 400 has a capability to display images to accept user operation. The input and output device 400 is implemented by a display and an operation device connected to the I/F 15.

The network I/F 15F is an interface through which the DFE 1 communicates with another device such as a host terminal via a network, and, for example, Ethernet (registered trademark) or Universal Serial Bus (USB) interface is used. The network I/F 15F supports communication using the TCP/IP protocol. The network I/F 15F is implemented by the I/F 15.

The controller 100 includes a main control unit 110, an engine control unit 120, an image processing unit 130, an operation display control unit 140, and an input and output (I/O) control unit 150. The controller 100 is constructed by a combination of the hardware and software illustrated in FIG. 8. More specifically, a program stored in a non-volatile memory, such as the ROM 12, the HDD 14, and a non-volatile storage medium such as an optical disk, is loaded into a volatile memory (hereinafter referred to as a memory) such as the RAM 13.

The CPU 11 performs computation according to the program loaded in the RAM 13 or the like. The controller 100 is constructed by control software implemented by collaboration of the above-mentioned functional units and a hardware such as an integrated circuit. The controller 100 controls the entire DFE 1.

Further, the printer controller 20C is configured by control software implemented by the CPU 20Cp performing computation according to a program loaded on a volatile memory such as a RAM and hardware such as an integrated circuit. Similarly, the pre-coating controller 30C is constructed by software implemented by the CPU 30Cp performing computation according to a program loaded on a volatile memory such as a RAM and hardware such as an integrated circuit.

The main control unit 110 controls respective units of the controller 100, that is, gives commands to respective units of the controller 100. The engine control unit 120 serves as a transmission control unit that outputs signals to the inkjet apparatus 2, the pretreatment apparatus 3, the carrying-in unit 17, and the discharge unit 60; or a drive unit that drives the inkjet apparatus 2, the pretreatment apparatus 3, the carrying-in unit 17, and the discharge unit 60. Under the control of the main control unit 110, the image processing unit 130 generates drawing data such as bitmap data based on the information of the image to be output. The drawing data is information for drawing an image to be formed by the inkjet apparatus 2 or the pretreatment apparatus 3 in the image forming operation, that is, information on an image to be output (printed).

The operation display control unit 140 displays information on the input and output device 400 or notifies the main control unit 110 of information input via the input and output device 400. The I/O control unit 150 inputs information input via the network I/F 15F to the main control unit 110. Further, the main control unit 110 controls the I/O control unit 150 and accesses, via the network I/F 15F and the network, other devices connected to the network.

An operation executed by the DFE 1 is described below. First, the I/O control unit 150 receives a print job as command information for executing image formation from a host device or the like via the network I/F 15F. The I/O control unit 150 transfers the received print job to the main control unit 110. In response to a receipt of the print job, the main control unit 110 controls the image processing unit 130 to generate drawing data based on document information or image information included in the print job.

In addition to the image information in which information on an information to be output is described in the format analyzable by the image processing unit 130 of the DFE 1, the print job according to the present embodiment includes information of parameters to be set upon image formation. The information of the parameters is, for example, information such as duplex printing setting, combine printing setting, color/monochrome setting, and the like.

As the image processing unit 130 generates drawing data, the engine control unit 120 transmits the print output data and the pretreatment output data to the inkjet apparatus 2 and the pretreatment apparatus 3, respectively, and, based on the generated drawing data, causes the apparatuses to execute respective image formation on the sheet conveyed from the sheet feeder 18.

Figure 11:
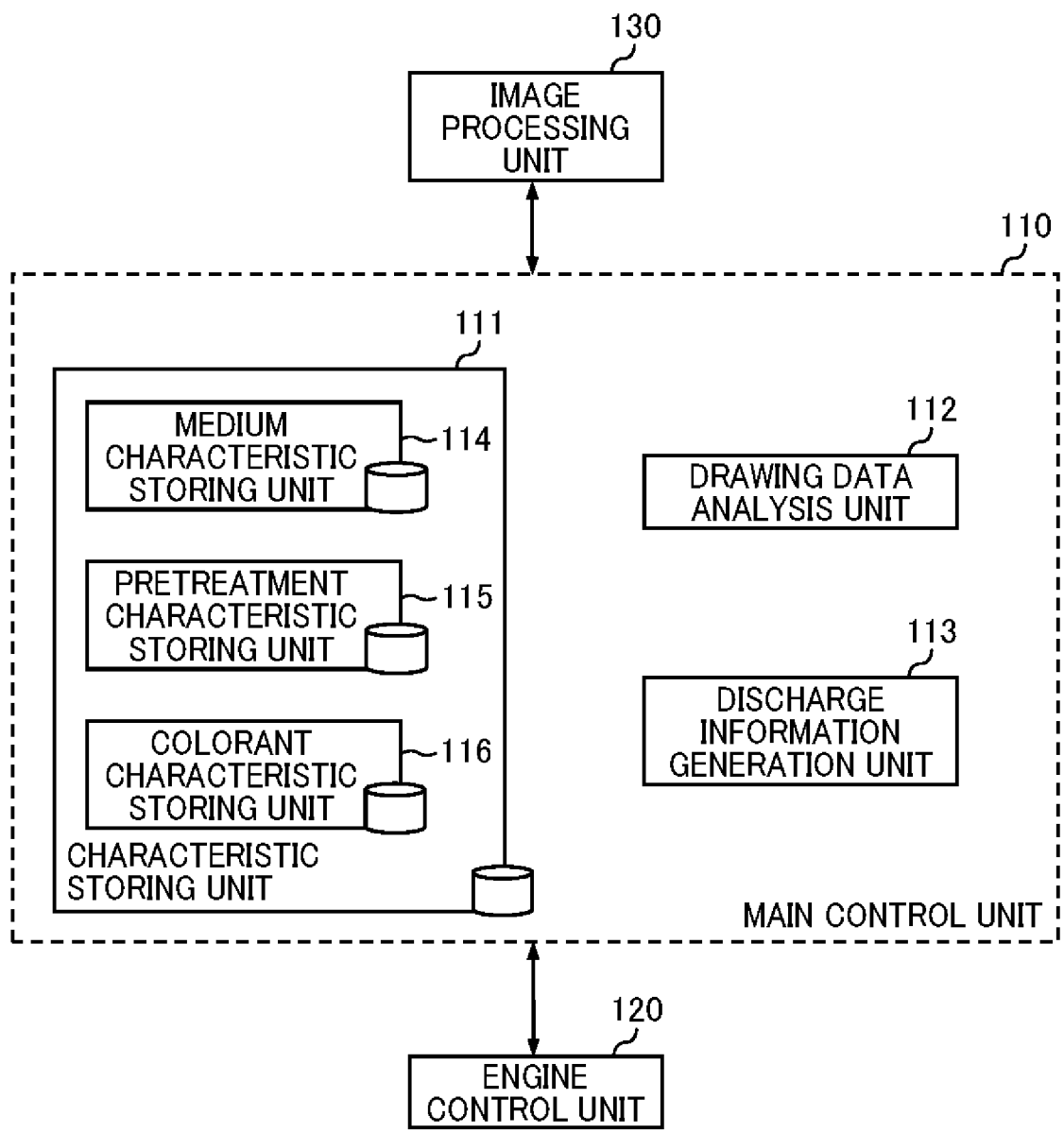
FIG. 11 is a functional block diagram of a main control unit of the inkjet system according to Embodiment 1.

As described above, in the present embodiment, the main control unit 110 controls each unit of the controller 100. Next, descriptions are given below of a functional configuration of the main control unit 110 according to the present embodiment with reference to FIG. 11.

The main control unit 110 according to the present embodiment includes a characteristic storing unit 111, a drawing data analysis unit 112, and a discharge information generation unit 113 for information on discharge of the pretreatment agent. The main control unit 110 functions as a pretreatment execution controller. The characteristic storing unit 111 includes a medium characteristic storing unit 114, a pretreatment characteristic storing unit 115, and a colorant characteristic storing unit 116. In one embodiment, a characteristic data table SD (see FIG. 12) is stored in the characteristic storing unit 111.

In the present embodiment, for each of the pretreatment agent discharge head 31L and the pretreatment agent discharge head 31H described later, the discharge information generation unit 113 can generate data in which values "0" and "1" are arranged. The values "0" and "1" represent whether the head is to discharge a predetermined amount of liquid (droplet) for each pixel to which a droplet is dischargeable by the head.

Further, instead of data specifying whether to discharge liquid (droplet), data specifying the discharge amount set for each pixel can be generated. At this time, combining the amount of discharge of pretreatment agent having a high aggregating agent concentration ACG with the amount of discharge of pretreatment agent having a low aggregating agent concentration ACG is advantageous in that the behavior of the droplet LD discharged can be controlled for each pixel in the pretreatment. Further, the unit of the discharge amount can be larger than a pixel. The following description is on the assumption that, for generation of the discharge information, there are a case of information indicating whether to discharge the pretreatment agent and a case of information specifying the amount of discharge of pretreatment agent.

In FIG. 12, the column "Dot state" indicates how the dot state changes when the aggregating agent concentration is increased. As illustrated in FIG. 12, the characteristic data table SD presents relations between the distribution state of the pigment particles P in the dots Dt formed by the droplets LD adhering to the recording medium M and the size of the dot Dt (dot diameter), for example, for combinations (a) to (d). In the present embodiment, the distribution state is uniformity in concentration of the pigment particles P from the center of the dot Dt toward the outer circumference, etc. The characteristic data table SD presents such relations as characteristic information for each combination of the type of ink IK and the type of the pretreatment agent PCA. The characteristic data table SD is created for each type of the recording medium M.

As illustrated in FIG. 12, for example, in the case of combination (a) where a droplet LD containing a colorant A and a droplet LD containing a pretreatment agent a are applied onto a recording medium M1, the relation between the concentration of pigment particles P distributed in the dot Dt and the size of the dot Dt is as follows. As the concentration of the aggregating agent AG contained in the pretreatment agent a increases, the size of the dot Dt increases, and the distribution uniformity of the pigment particles P lowers from the center of the dot Dt toward the outer circumference.

Additionally, for example, in the case of combination (d) where a droplet LD containing a colorant B and a droplet LD containing a pretreatment agent d are applied onto the recording medium M1, the relation between the concentration of pigment particles P distributed (i.e., distribution concentration) in the dot Dt and the size of the dot Dt is as follows. As the concentration of the aggregating agent AG contained in the pretreatment agent d increases, the size of the dot Dt decreases, but the distribution uniformity of the pigment particles P improves from the center of the dot Dt toward the outer circumference.

That is, the distribution state of the pigment particles P in the dot Dt and the size of the dot Dt can be controlled by referring to the characteristic data table SD. In other words, using the characteristic data table SD, the behavior of the droplet LD containing the colorant (image forming agent) can be controlled.

As described above, the characteristic data table SD includes, for each combination of type of ink IK and type of pretreatment agent PCA, the relation between the distribution concentration of the pigment particles P in the dot Dt and the size of the dot Dt, as characteristic information.

Alternatively, the characteristic data table SD can be constructed by input of information (being a result of image output) indicating the relation between the distribution state of the pigment particles P in the dot Dt and the size of the dot Dt, for each combination of type of ink IK and type of pretreatment agent PCA. Yet alternatively, the characteristic data table SD can be constructed by characteristic information obtained as a result of an experiment or a simulation. Details of the characteristic data table SD will be described later.

When the influence of the type of the recording medium M (for example, plain paper, coated paper, film, etc.) and the type of ink IK is limited, the characteristic storing unit 111 can be configured not to include a characteristic data table. In the present embodiment, as described later, information indicating the type of image to be output and information indicating the aggregating agent concentration ACG in the droplet LD of the ink IK will suffice.

The medium characteristic storing unit 114 stores medium characteristic information, which is information on physical characteristics of the recording medium M. The medium characteristic information is information indicating whether the recording medium M is an impermeable medium or a permeable medium and indicates the degree of permeation of the droplet LD relative to the recording medium M. An example impermeable medium is film, and example permeable media include plain paper and coated paper.

Figure 13A:
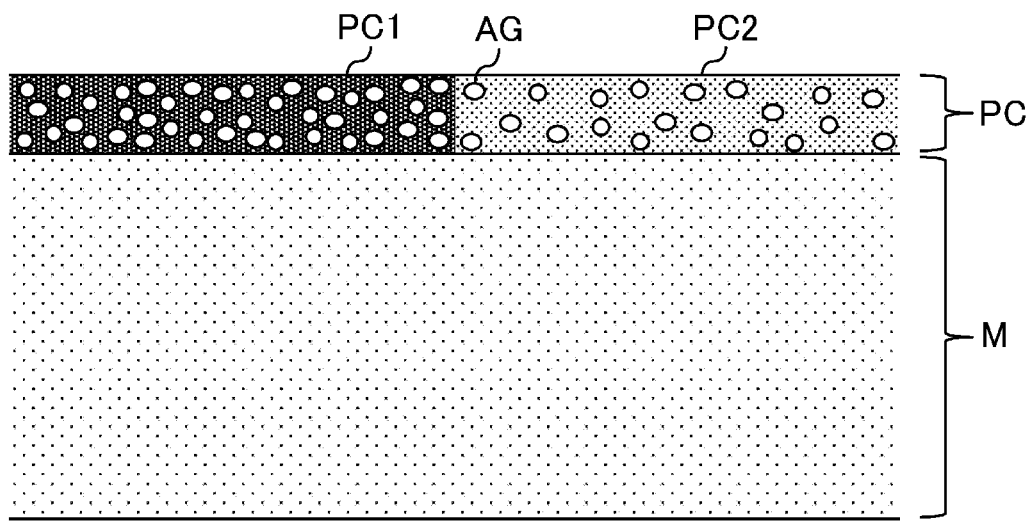
FIGS. 13A and 13B are views of a pretreatment region according to Embodiment 1.
Figure 13B:
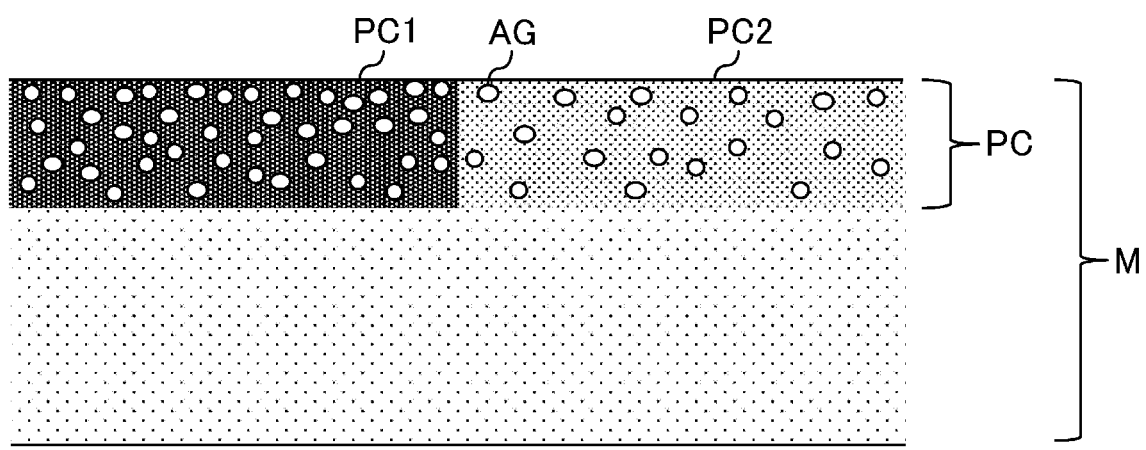

The difference in degree of permeation of the droplet LD in the recording medium M will be described with reference to FIGS. 13A and 13B. When the pretreatment agent PCA is discharged onto the recording medium M which is an impermeable medium, the pretreatment region PC is formed on the surface of the recording medium M as illustrated in FIG. 13A. By contrast, when the pretreatment agent PCA is discharged onto the recording medium M which is a permeable medium, the pretreatment region PC is formed on the surface of the recording medium M and inside a tissue of the recording medium M, as illustrated in FIG. 13B. In FIGS. 13A and 13B, the pretreatment region PC includes a pretreatment region PC1 formed by a pretreatment agent PCA1 and a pretreatment region PC2 formed by a pretreatment agent PCA2.

The pretreatment characteristic storing unit 115 stores pretreatment agent characteristic information, which is information on characteristics of the pretreatment agent PCA1 discharged from the pretreatment agent discharge head 31H and of the pretreatment agent PCA2 discharged from the pretreatment agent discharge head 31L. The pretreatment agent characteristic information is, for example, information indicating a material and a physical characteristic of the pretreatment agent PCA (PCA1 and PCA2).

The colorant characteristic storing unit 116 stores colorant characteristic information which is information on the characteristics of each of yellow, magenta, cyan, and black inks respectively discharged from colorant discharge heads 21. The colorant characteristic information is, for example, information indicating a material and a physical characteristic of the colorant for exhibiting each of yellow, magenta, cyan, and black colors.

The main control unit 110 can be configured to add the characteristic information to the characteristic data table SD, with reference to the pretreatment agent characteristic information and the colorant characteristic information, based on the result of the image output. For example, in a case of image formation with the combination (c) in FIG. 12 (the colorant B and the pretreatment agent c), it is assumed that the size of the dot Dt decreases as the concentration of the pretreatment agent c increases, but the distribution state of the colorant does not change. In such a case, the main control unit 110 adds the characteristic information as presented as the combination (c) in FIG. 12 to the characteristic data table SD.

The drawing data analysis unit 112 analyzes the drawing data input from the image processing unit 130 to the main control unit 110. In one embodiment, the drawing data analysis unit 112 is configured as an image type determiner that determines image type based on the analysis result. Alternatively, since the analysis result varies depending on the type of the image to be output, the drawing data analysis unit 112 can be configured to output an analysis result to the discharge information generation unit 113, without determining image type based on the drawing data.

Descriptions are given below of, as one example, a configuration in which the drawing data analysis unit 112 is configured not to determine the type of the image to be output but is configured to output an analysis result that varies depending on image type to the discharge information generation unit 113. An example configuration in which the drawing data analysis unit 112 determines the type of image to be output will be described later.

Further, the drawing data analysis unit 112 can be configured to output the type and amount of ink consumed for each pixel as an analysis result. Further, the drawing data analysis unit 112 can be configured to analyze the drawing data and output the manner of image output as an analysis result.

The discharge information generation unit 113 serves as a pretreatment-agent discharge information generation unit (a first liquid discharge information generation unit and a second liquid discharge information generation unit) that generates discharge information of the pretreatment agent to be discharged, respectively, from the pretreatment agent discharge heads 31H and 31L, based on the analysis result of the drawing data by the drawing data analysis unit 112 and various characteristic information stored in the characteristic storing unit 111.

The drawing data analysis unit 112 calculates a spatial frequency based on the drawing data, as an analysis method. For example, the drawing data is divided into regions of a predetermined size, and the spatial frequency is calculated by two-dimensional Fourier transform of the drawing data for each divided region. Then, the calculated spatial frequency is transmitted to the discharge information generation unit 113. The method of analyzing the drawing data is not limited to the two-dimensional Fourier transform. As long as the information that varies depending on image type can be obtained, the analysis method of drawing data is not limited to calculation of spatial frequency.

At this time, for example, regarding the region of an image larger in spatial frequency than a predetermined value, the discharge information generation unit 113 determines to set the size of the dot Dt smaller and equalize the distribution concentration of the pigment particle P in the dot Dt. Then, the discharge information generation unit 113 generates discharge information of the pretreatment agent PCA1 and the pretreatment agent PCA2. For example, the predetermined value is determined empirically and stored in a memory by a manufacturer.

For example, regarding the region of an image having a medium spatial frequency, the discharge information generation unit 113 determines to output the image with the size of the dot Dt being moderate and generates the discharge information of the pretreatment agent PCA1 and the pretreatment agent PCA2.

For example, regarding the region of an image smaller in spatial frequency than the predetermined value, the discharge information generation unit 113 determines to increase the size of the dot Dt and makes the distribution concentration of the pigment particle P thicker on the center size and generates the discharge information of the pretreatment agent PCA1 and the pretreatment agent PCA2.

In the inkjet system 4 according to the present embodiment, in some cases, the user inputs, to the main control unit 110, area information specifying an area in which an image is formed such that the size of the dot Dt is reduced and area information specifying an area in which an image is formed such that the size of the dot Dt is enlarged.

In such a case, the drawing data analysis unit 112 can be configured to output the area information as an analysis result, and the discharge information generation unit 113 can be configured to generate the discharge information of the pretreatment agent PCA1 and the pretreatment agent PCA2 based on the area information.

Specifically, based on the area information, for the area where the image formation is executed with the size of the dot Dt reduced, the discharge information generation unit 113 determines that the image is output such that the size of the dot Dt is reduced and the distribution of the pigment particles P in the dot Dt is uniform, and generates the discharge information of the pretreatment agent PCA1 and the pretreatment agent PCA2.

By contrast, for the area where the image formation is executed with the size of the dot Dt increased, the discharge information generation unit 113 determines that the image is output such that the size of the dot Dt increases and the concentration of the pigment particles P in the dot Dt becomes thicker toward the center of the dot Dt, and generates the discharge information of the pretreatment agent PCA1 and the pretreatment agent PCA2.

Figure 15A:
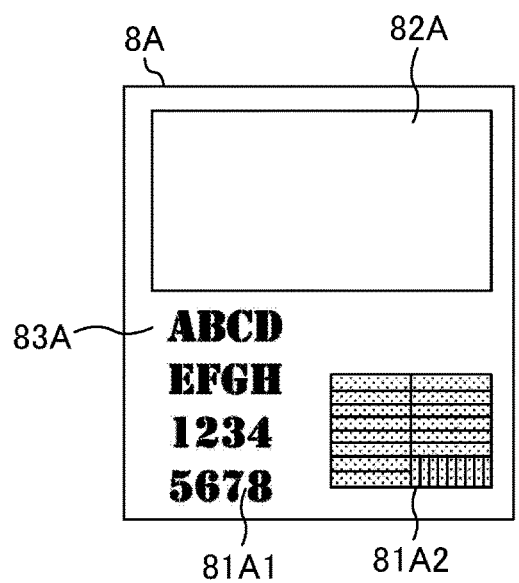
FIGS. 15A and 15B illustrate position information according to Embodiment 1.
Figure 15B:
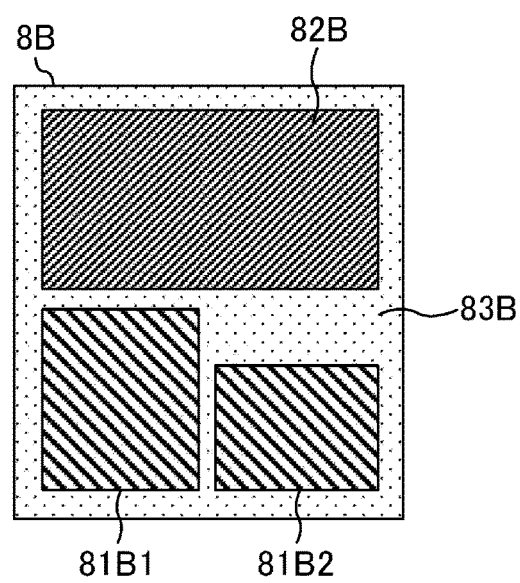

Furthermore, as illustrated in FIGS. 15A and 15B, in some cases, the job data input from the DFE 1 includes position information indicating a picture area (e.g., a photograph area) in the drawing data, and a text area (e.g., an area of letters) in the drawing data. FIG. 15A is a diagram illustrating information of an image to be output according to the present embodiment, and FIG. 15B is a diagram illustrating the drawing data according to the present embodiment.

As illustrated in FIG. 15A, image information 8A includes line areas 81A1 and 81A2 (collectively "line areas 81A") in which letters and lines are represented, and a photograph area 82A in which a photograph is represented. In FIG. 15A, an area other than the line areas 81A and the photograph area 82A is presented as an area 83A.

FIG. 15B illustrates drawing data 8B obtained through the RIP processing of the image information 8A. The drawing data 8B includes line areas 81B1 and 81B2 (collectively "line areas 81B") in which letters and lines are represented, and a photograph area 82B in which a photograph is represented. In FIG. 15B, an area other than the line areas 81B and the photograph area 82B are presented as an area 83B.

In such a case, the drawing data analysis unit 112 outputs, as an analysis result, the information of the type of the image such as the line area 81B, the photograph area 82B, and the area 83B; and the position information such as coordinates respectively indicating the line area 81B, the photograph area 82B, and the area 83B. Then, the discharge information generation unit 113 can be configured to generate the discharge information of the pretreatment agent PCA1 and the pretreatment agent PCA2 based on the position information.

Specifically, based on the position information, regarding the area of letters on the drawing data, the discharge information generation unit 113 determines that an image is output such that the size of the dot Dt is small and distribution of the pigment particle P in the dot Dt is uniform and generates the discharge information of the pretreatment agent PCA1 and the pretreatment agent PCA2.

By contrast, regarding the area of a picture (e.g., a photograph) on the drawing data, the discharge information generation unit 113 determines that an image is output such that the size of the dot Dt is large and the distribution of the pigment particle P in the dot Dt becomes thicker toward the center of the dot Dt, and generates discharge information of the pretreatment agent PCA1 and the pretreatment agent PCA2.

When the drawing data analysis unit 112 determines the type of the image to be output based on the drawing data, the drawing data analysis unit 112 determines the type of the image from, for example, the spatial frequency. Types of images are letters, pictures, tables, and the like. In this case, the drawing data analysis unit 112 outputs the determined type of image and the position information of the image as an analysis result.

For example, there are cases where the user inputs, via an interface such as the input and output device 400, information of letters and photographs for each area. In such a case, the drawing data analysis unit 112 can be configured to determine the type of the image based on the input information on the letter or the photograph and transmit the determination result to the discharge information generation unit 113.

In the case where the user inputs information of letters and photographs for each area, the discharge information generation unit 113 can be configured to generate the discharge information of the pretreatment agent PCA1 and the pretreatment agent PCA2 based on the input information of letters and photographs.

The discharge information of the pretreatment agent PCA1 and the pretreatment agent PCA2 thus calculated by the discharge information generation unit 113 is transmitted to the pretreatment apparatus 3 via the engine control unit 120 by the main control unit 110.

In the present embodiment, the pretreatment apparatus 3 includes the pretreatment agent discharge head 31H to discharge the pretreatment agent PCA1 in which the concentration of the aggregating agent AG is higher and the pretreatment agent discharge head 31L to discharge the pretreatment agent PCA2 in which the concentration of the aggregating agent AG is lower. As illustrated in FIG. 14, onto the recording medium M, the pretreatment apparatus 3 discharges the pretreatment agent PCA1 having a high aggregating agent AG concentration and the pretreatment agent PCA2 having a low aggregating agent AG concentration, respectively from the pretreatment agent discharge head 31H and the pretreatment agent discharge head 31L.

As illustrated in FIGS. 13A and 13B, the pretreatment region PC1 is formed in the area where the pretreatment agent PCA1 has been discharged, and the pretreatment region PC2 is formed in the area where the pretreatment agent PCA2 has been discharged. Here, a description is given below, assuming that the droplet LD of the combination (a) in FIG. 12 has been discharged to the pretreatment region PC illustrated in FIGS. 13A and 13B.

In the pretreatment region PC1, since the concentration of the aggregating agent AG is high, the distribution state of the colorant A in the dot Dt is not uniform, and the size of the dot Dt formed is large. By contrast, in the pretreatment region PC2, since the concentration of the aggregating agent AG is low, the distribution state of the colorant A in the dot Dt is uniform, and the size of the dot Dt formed is small.

As described above, the inkjet system 4 according to the present embodiment is configured to control the size of the dot Dt, which is a colored region formed by the droplet LD containing the colorant and adhering to the recording medium M, and the distribution state of the colorant in the dot Dt, depending on the concentration of the aggregating agent AG in the pretreatment region PC on the recording medium M.

In one embodiment, the discharge information generation unit 113 is configured to calculate first and second liquid discharge amounts, which are the discharge amounts of the pretreatment agents PCA1 and PCA2, respectively, such that the pretreatment agent discharge heads 31H and 31L discharge the pretreatment agents PCA1 and PCA2 on the same area on the recording medium M. In this case, the pretreatment apparatus 3 discharges the pretreatment agent PCA1 and the pretreatment agent PCA2 onto the same area to form the pretreatment region PC.

Next, descriptions are given below of a flow for calculating the amount of discharge of the pretreatment agent PCA in the inkjet system 4 according to the present embodiment, with reference to the flowchart in FIG. 16. In response to a receipt of the job data (S1601), the main control unit 110 transfers the received job data to the image processing unit 130.

Based on the job data, the image processing unit 130 sets the print setting specified in the job data for the image information and executes RIP processing, thereby generating drawing data such as bitmap data for executing image formation and output (S1602).

At this time, as the setting information for setting print setting and generating drawing data, the job data includes, for example, medium setting information for setting the recording medium M, density setting information for setting the density of the image to be formed and output, color setting information specifying in which of color and monochrome image is to be output, and mode setting information to be set when image output is precisely performed.

The image processing unit 130 transmits the drawing data and the setting information generated by the RIP processing to the main control unit 110 (S1603). Based on the received drawing data and the setting information, the discharge information generation unit 113 refers to the characteristic storing unit 111 and acquires the characteristic information of the recording medium M (S1604).

Next, the discharge information generation unit 113 refers to the characteristic storing unit 111 and acquires the pretreatment agent characteristic information and the colorant characteristic information (S1605). At this time, the discharge information generation unit 113 can acquire the characteristic information from the characteristic data table SD.

In addition, the drawing data analysis unit 112 analyzes the drawing data based on the received drawing data and the setting information and transmits the analysis result to the discharge information generation unit 113 (S1606). Based on the characteristic information and the analysis result of the drawing data acquired in S1604 and S1605, the discharge information generation unit 113 calculates discharge amounts of the pretreatment agents PCA1 and PCA2 for each pixel obtained from the analysis result (S1607).

In S1607, the discharge amount of any of the pretreatment agent PCA1 and the pretreatment agent PCA2 can be calculated as "0". The main control unit 110 transmits pretreatment agent amount information, which indicates the calculated discharge amounts of the pretreatment agents PCA1 and PCA2, to the pretreatment apparatus 3 via the engine control unit 120 (S1608).

Next, a flow of image formation and output in the inkjet system 4 according to the present embodiment will be described. After finishing the processing illustrated in the flowchart of FIG. 16, the main control unit 110 transmits pretreatment execution information for causing the pretreatment apparatus 3 to execute pretreatment.

In response to a receipt of pretreatment execution information from the DFE 1, the pretreatment apparatus 3 discharges the pretreatment agent PCA1 and the pretreatment agent PCA2 to the recording medium M based on the pretreatment agent amount information received from the DFE 1 in S1608, as pretreatment.

The main control unit 110 transmits image formation execution information to the inkjet apparatus 2. At the timing when the recording medium M pretreated by the pretreatment apparatus 3 reaches the inkjet apparatus 2 and reaches the discharge positions of the colorant discharge heads 21K, 21C, 21M, and 21Y, the inkjet apparatus 2 discharges liquid droplets respectively containing the colorants to the recording medium M.

The position measured by a measuring device 5A, the position where the pretreatment apparatus 3 has performed the pretreatment, and the position where the colorant discharge heads 21 discharges droplets are managed as information indicating the position of the recording medium M being conveyed (conveyance position). As the measuring device 5A, the pretreatment apparatus 3, and the colorant discharge heads 21 operate in synchronization according to instructions from the main control unit 110, an image is formed on the recording medium M.

Therefore, the main control unit 110 functions as a liquid discharge control unit that causes the inkjet apparatus 2 and the pretreatment apparatus 3 to discharge droplets. The main control unit 110 also functions as a treatment liquid discharge execution controller that causes the pretreatment apparatus 3 to discharge droplets of treatment liquid such as the pretreatment agent PCA. The main control unit 110 also functions as a colorant liquid discharge execution controller that causes the inkjet apparatus 2 to discharge colored droplets containing a colorant. The recording medium M on which the image is formed is discharged from the discharge unit 60.

As described above, in the present embodiment, the inkjet system 4 controls the amount of the pretreatment agent based on the type of the image to be recorded on the recording medium M to control the state of the droplets LD discharged, thereby controlling the shape or state of the dots formed by the pigment particles P contained in the droplets LD. With such control, the inkjet system 4 can prevent degradation of quality of images formed on the recording medium M and form high-quality images.

In the present embodiment, the pretreatment region PC1 is formed in the area where the pretreatment agent PCA1 has been discharged, and the pretreatment region PC2 is formed in the area where the pretreatment agent PCA2 has been discharged. Alternatively, the pretreatment region PC can be formed by the pretreatment agent PCA1 and the pretreatment agent PCA2 applied to the same area. In such a pretreatment region PC, the aggregating agent concentration AGC can be controlled more finely.

Furthermore, although the description above concerns controlling the discharge of two different pretreatment agents different in concentration, alternatively, the amount of discharge of one pretreatment agent PCA can be adjusted to control the manner of pretreatment. In this case, one pretreatment agent discharge head 31 can suffice.

The liquid droplets LD discharged onto the recording medium M from the inkjet apparatus 2 and the pretreatment apparatus 3 can include, in addition to the pigment particles P, dye; biomolecule such as protein, lipid, nucleic acid, hormone, sugar, and amino acid; resin; polymer; or the like. As a reactant, the pretreatment agent PCA can contain, in addition to the aggregating agent AG, a chelating agent, a fibrin-based adhesive, hydroxyapatite, a polymerization agent, or the like.

Furthermore, the inkjet system 4 according to the present embodiment can be modified to a three-dimensional (3D) fabricating apparatus such as a 3D printer.

Embodiment 2

In the present embodiment, descriptions are given of, as an example, a serial head inkjet apparatus that conveys a recording medium and discharges liquid droplets from a discharge head movable in the main scanning direction, for image output. The same reference numerals are given to the same configurations as those in Embodiment 1, and redundant explanations are omitted.

Figure 17:
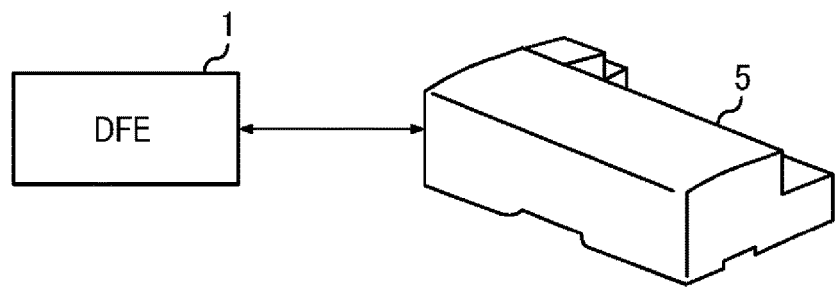
FIG. 17 is a schematic view of an inkjet system according to Embodiment 2.

FIG. 17 is a schematic view of the inkjet system 4 according to the present embodiment. In the inkjet system 4 according to the present embodiment, the DFE 1 and an image forming apparatus 5 are connected by a communication line. Note that, in the image forming apparatus 5 according to the present embodiment, the inkjet apparatus 2 and the pretreatment apparatus 3 of Embodiment 1 are combined in one casing.

Next, descriptions are given below of the configuration of the image forming apparatus 5 according to the present embodiment, with reference to FIGS. 18 and 19, which are a perspective view and a cross-sectional view of the image forming apparatus 5. The image forming apparatus 5 includes the inkjet apparatus 2, the pretreatment apparatus 3, and a carriage 101. The carriage 101 moves the inkjet apparatus 2 and the pretreatment apparatus 3 in the main scanning direction inside the image forming apparatus 5.

Figure 18:
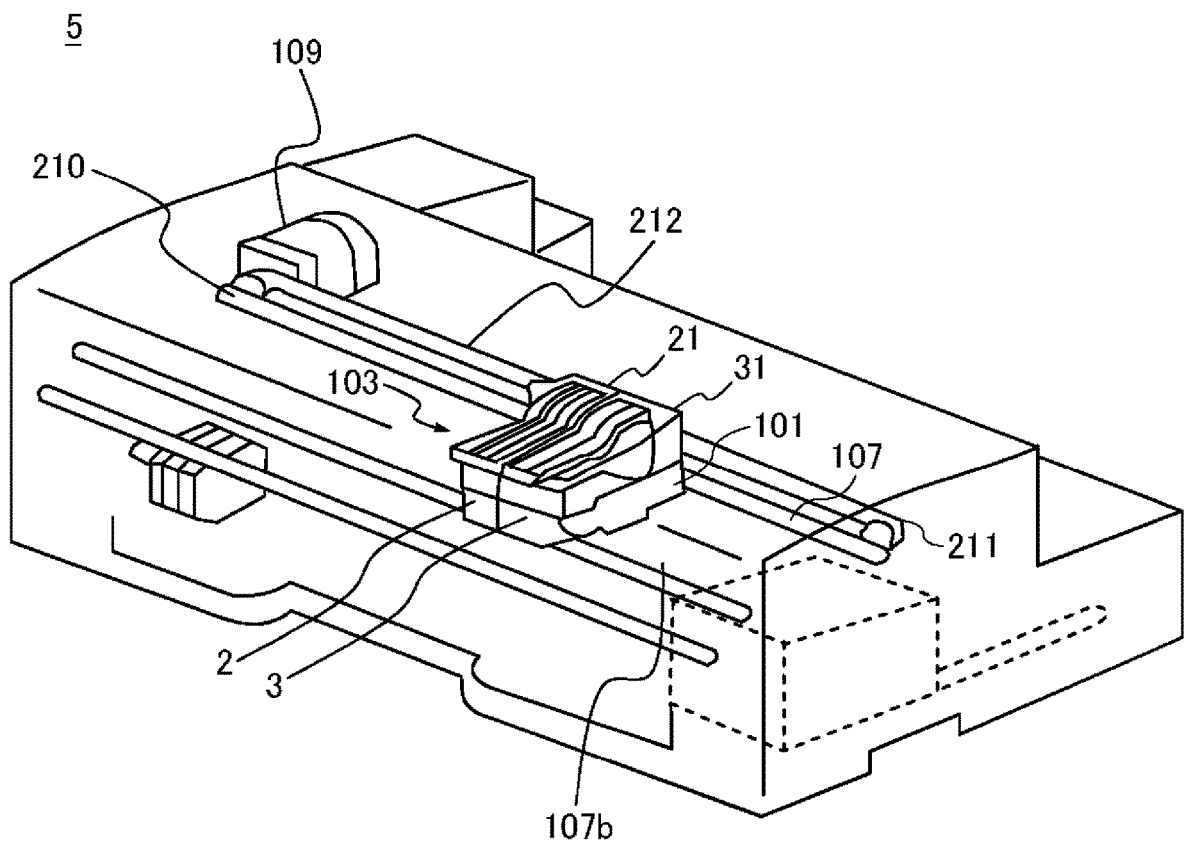
FIG. 18 is a perspective view of an image forming apparatus according to Embodiment 2.
Figure 19:
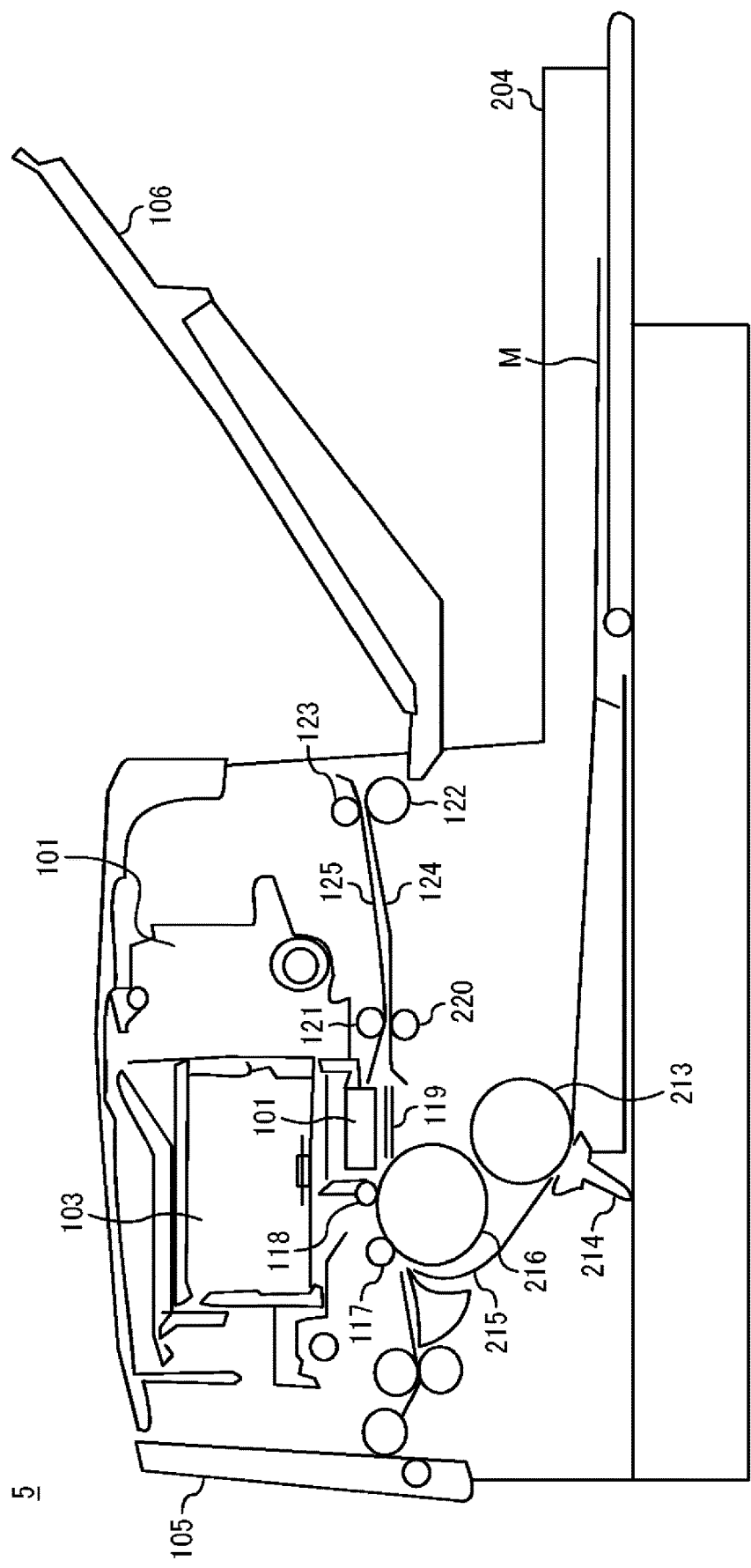
FIG. 19 is a cross-sectional view of the image forming apparatus according to Embodiment 2.

The carriage 101 is disposed to slide, in the main scanning direction (the direction perpendicular to the direction of conveyance of the sheet), on a main guide rod 107 and a sub guide rod 107b laterally bridging side plates in FIG. 18. On the carriage 101, the inkjet apparatus 2 and the pretreatment apparatus 3 are mounted.

Then, the colorant discharge heads 21 in the inkjet apparatus 2 respectively discharge yellow, magenta, cyan, and black colorants, and the pretreatment agent discharge heads 31 in the pretreatment apparatus 3 discharge the pretreatment agent PCA onto the recording medium M. The colorant discharge heads 21 and the pretreatment agent discharge heads 31 are arranged in a direction crossing the main scanning direction, and the nozzles 40N (see FIG. 6) are open downward. The pretreatment agent discharge heads 31 function as a pretreatment execution device.

The image forming apparatus 5 further includes cartridges 103 for supplying liquids containing the respective colorants to the colorant discharge heads 21 and the liquid containing the pretreatment agent PCA to the pretreatment agent discharge heads 31. The cartridges 103 are replaceably mounted on the carriage 101. The cartridge 103 includes an air vent communicating with the atmosphere on an upper side and a supply port for supplying the liquid (droplets LD) to the colorant discharge head 21 or the pretreatment agent discharge head 31 on a lower side. The cartridge 103 includes a porous body filled with droplets LD.

The internal pressure of the cartridge 103 is maintained such that the droplet LD supplied by the capillary force of the porous body has a slight negative pressure. In the present embodiment, although the colorant discharge head 21 is provided for each of a plurality of colors alternatively, a single head can have nozzles 40N to discharge droplets LD of yellow, magenta, cyan, and black. Similarly, although the pretreatment agent discharge head 31 is provided for each of the aggregating agents AG of different concentrations, alternatively, a single head can have nozzles 40N to discharge droplets LD of the aggregating agent AG of different concentrations. Further, in one embodiment, the discharge amount of one type of pretreatment agent PCA discharged from one pretreatment agent discharge head 31 can be adjusted to control the manner of pretreatment.

The rear side (downstream side in the conveyance direction of recording medium) of the carriage 101 is slidably mounted on the main guide rod 107, and the front side (upstream side in the conveyance direction) thereof is slidably mounted on the sub guide rod 107b. In order to move the carriage 101 in the main scanning direction, a timing belt 212 is stretched between a driving pulley 210 and a driven pulley 211 driven by a main scanning motor 109. The carriage 101 is secured to the timing belt 212, and the carriage 101 reciprocates as the main scanning motor 109 rotates in a normal direction and the reverse direction.

Descriptions are given below of a mechanism to convey the recording medium M stacked on a sheet tray 204 (or a sheet feeding cassette) to the lower side of the carriage 101. A sheet feeding roller 213 and a friction pad 214 separate and feed the recording medium M from the sheet tray 204. A guide 215 guides the recording medium M. A conveyance roller 216 reverses and conveys the recording medium M. A conveyance roller 117 is pressed against the circumferential surface of the conveyance roller 216, and a leading end roller 118 defines a feed-out angle of the recording medium M from the conveyance roller 216. The conveyance roller 216 is driven via a gear train by a sub-scanning motor.

Corresponding to a range in the main scanning direction in which the carriage 101 travels, a printing receiving guide 119 is provided to guide the recording medium M fed from the conveyance roller 216, from below the colorant discharge heads 21 and the pretreatment agent discharge heads 31.

Downstream in the direction of conveyance of the recording medium M from the printing receiving guide 119, a conveyance roller 220 and a spur roller 121 are disposed. The conveyance roller 220 and the spur roller 121 rotate to forward the recording medium M in the direction in which the recording medium M is ejected outside the image forming apparatus 5. The image forming apparatus 5 further includes a sheet ejection roller 122 and a spur roller 123 to send the recording medium M to an output tray 106 and guide members 124 and 125 that define a passage to discharge the recording medium M to the outside the image forming apparatus 5.

Figure 20:
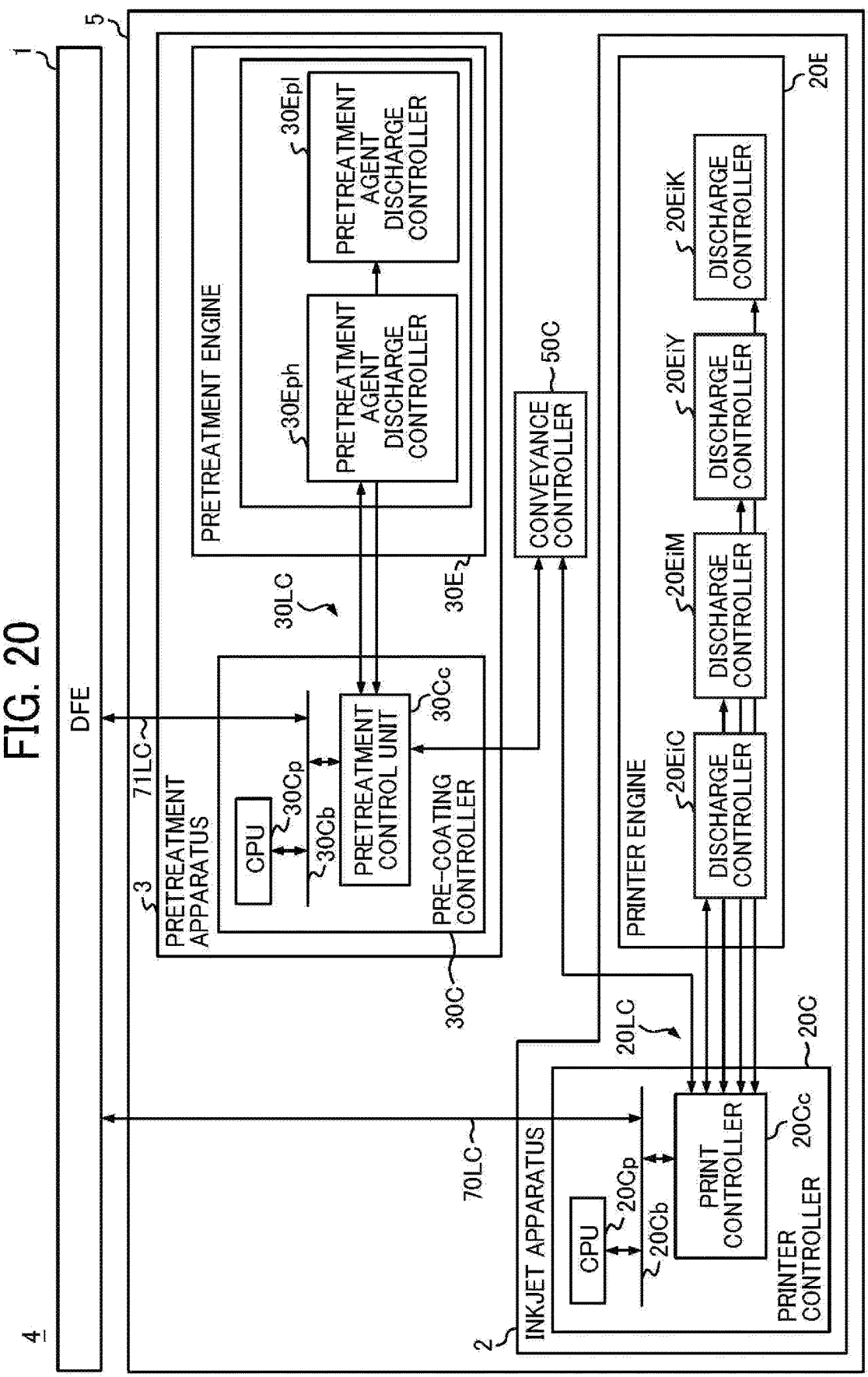
FIG. 20 is a functional block diagram of the image forming apparatus according to Embodiment 2.

Next, descriptions are given below of a functional configuration of the image forming apparatus 5 according to the present embodiment, with reference to FIG. 20. The image forming apparatus 5 according to the present embodiment includes a conveyance controller 50C for controlling conveyance of the recording medium M, in addition to the functions of the inkjet apparatus 2 and the pretreatment apparatus 3 illustrated in FIG. 9.

The conveyance controller 50C drives the sub-scanning motor based on the command information received from the print controller 20Cc and the pretreatment control unit 30Cc to convey the recording medium M. The print controller 20Cc and the pretreatment control unit 30Cc also function as a drive control unit that controls driving of the main scanning motor 109. Other configurations are the same as those in FIG. 9, so duplicate descriptions are omitted.

In the present embodiment, the inkjet apparatus 2 and the pretreatment apparatus 3 are combined and contained in one casing to construct the image forming apparatus 5. Therefore, an image forming controller, which controls the operation of the image forming apparatus 5, can control each unit of the image forming apparatus 5 based on the information received from the main control unit 110.

In such a case, based on the information received from the main control unit 110, the image forming controller causes the printer engine 20E to control the operation of the colorant discharge heads 21 and the pretreatment engine 30E to control the operation of the pretreatment agent discharge heads 31. At this time, the main control unit 110 functions as a liquid discharge control unit that causes the image forming apparatus 5 to discharge droplets.

Figure 21:
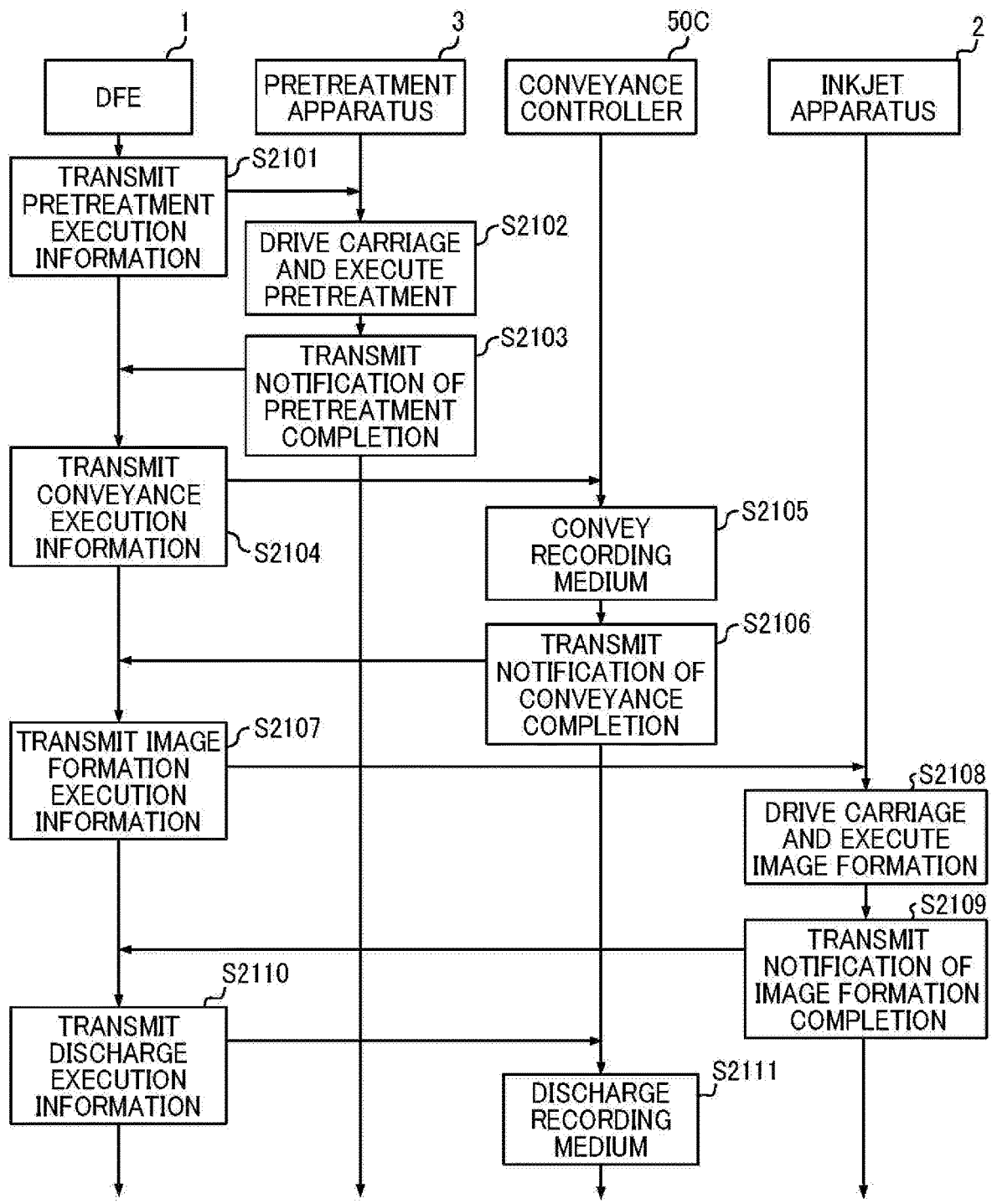
FIG. 21 is a sequence chart illustrating a flow of processing for image formation and output according to Embodiment 2.

Using the image forming apparatus 5 configured as described above, the inkjet system 4 according to the present embodiment executes image formation based on image information. Next, descriptions are given below of the flow of image formation in the inkjet system 4 according to the present embodiment, with reference to FIG. 21.

Figure 16:
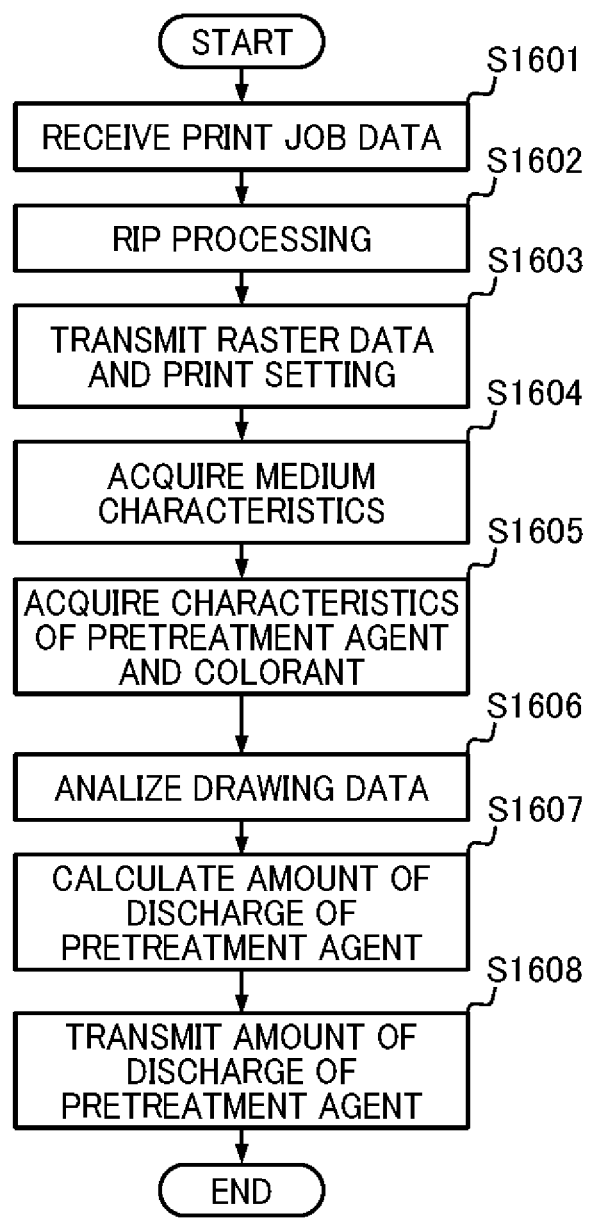
FIG. 16 is a flowchart of processing for calculating the amount of discharge of pretreatment agent according to Embodiment 1.

When the DFE 1 finishes the processing illustrated in the flowchart of FIG. 16, the main control unit 110 transmits pretreatment execution information for causing the pretreatment apparatus 3 to execute pretreatment (S2101). The pretreatment apparatus 3 discharges the pretreatment agent PCA1 and the pretreatment agent PCA2 to the recording medium M based on the pretreatment execution information received from the DFE 1, thereby executing pretreatment.

For discharge of the droplets LD to the recording medium M from the pretreatment agent discharge heads 31H and 31L, while driving the carriage 101, the pretreatment apparatus executes pretreatment (S2102). Specifically, the pretreatment control unit 30Cc drives the pretreatment agent discharge heads 31H and 31L based on the drawing data, to discharge the droplets including the pretreatment agent PCA for one line in the main scanning direction, onto the recording medium M kept stationary. When the discharge of one line is completed, the pretreatment apparatus 3 transmits a notification of pretreatment completion, indicating that pretreatment for one line has been executed, to the DFE 1 (S2103).

In response to a receipt of the notification of pretreatment completion from the pretreatment apparatus 3, the DFE 1 transmits conveyance execution information for conveying the recording medium M by one line in the sub-scanning direction to the image forming apparatus 5 (S2104). According to the conveyance execution information, in the image forming apparatus 5, the conveyance controller 50C drives the sub-scanning motor to convey the recording medium M by one line in the sub-scanning direction (S2105) and transmits a notification of conveyance completion to the DFE 1 (S2106).

In response to a receipt of the notification of conveyance execution, the DFE 1 transmits image formation execution information for causing the inkjet apparatus 2 to execute image formation for one line (S2107). For discharge of colorant droplets to the recording medium M from the colorant discharge heads 21, while moving the carriage 101, the print controller 20Cc drives the colorant discharge heads 21 of respective colors, based on the drawing data, to discharge the droplets LD containing respective color colorants onto the recording medium M for one line in the main scanning direction (S2108).

When discharge of one line is completed, the inkjet apparatus 2 causes the print controller 20Cc to drive the sub-scanning motor to convey the recording medium M and transmits a notification of image formation completion to the DFE 1 (S2109).

When image formation of entire drawing data included in the job data is completed, the DFE 1 transmits discharge execution information to the image forming apparatus 5 for ejecting the recording medium M (S2110). Then, the conveyance controller 50C drives the sub-scanning motor to discharge the recording medium M on which the image has been formed (S2111). When image formation of the entire drawing data included in the job data has not been completed, the DFE 1 executes again the operation starting at S2101.

Embodiment 3

In the present embodiment, descriptions are given below of an inkjet system that includes a pretreatment apparatus to apply the pretreatment agent PCA uniformly to the rolled sheet Md using a coater and then discharges the pretreatment agent PCA containing the aggregating agent AG according to the drawing data, as pretreatment. The same reference numerals are given to the same configurations as those in Embodiment 1, and redundant explanations are omitted.

Figure 22:
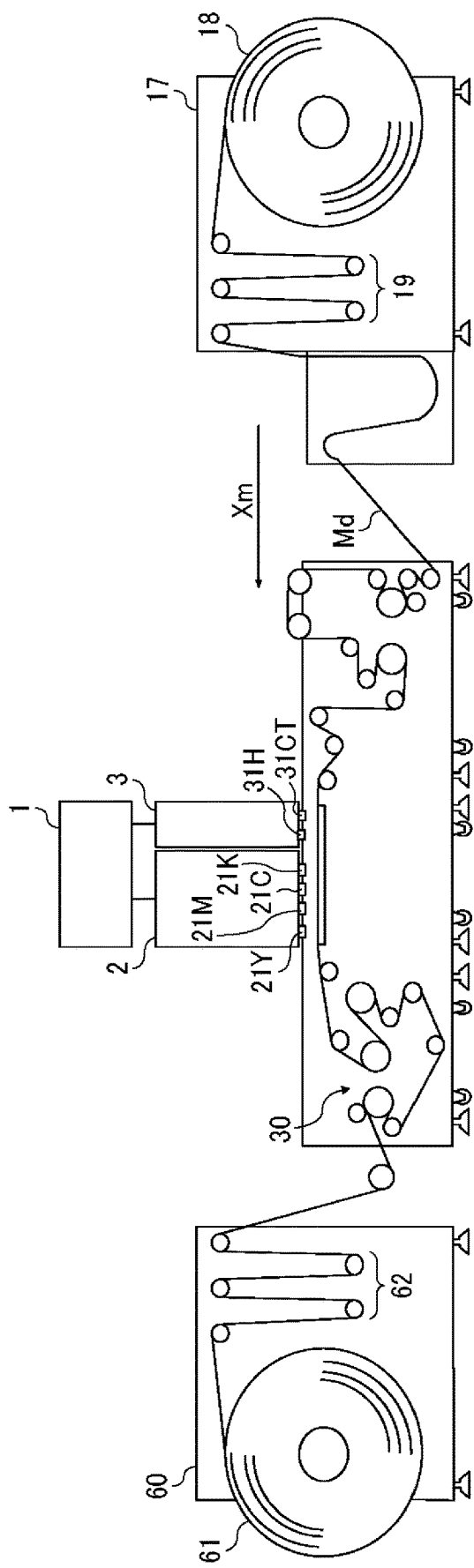
FIG. 22 is a schematic view of an inkjet system according to Embodiment 3.

FIG. 22 is a schematic view of the inkjet system 4 according to the present embodiment. The inkjet system 4 according to the present embodiment includes a coater 31CT for applying the pretreatment agent PCA to the recording medium M, instead of the pretreatment agent discharge head 31L illustrated in FIG. 4. The coater 31CT functions as a pretreatment execution device.

Devices usable as the coater 31CT include the following roller or pipe provided with liquid discharge ports. The roller or pipe is similar in width to the pretreatment agent discharge head 31 and capable of applying the pretreatment agent PCA to the rolled sheet Md uniformly in the main scanning direction. The operation of the coater 31CT is controlled by the pretreatment control unit 30Cc.

In the present embodiment, after the coater 31CT applies the pretreatment agent PCA2 to the recording medium M, the pretreatment agent discharge head 31H applies the pretreatment agent PCA1 onto the recording medium M to form the pretreatment region PC. At this time, in S1607, the pretreatment apparatus 3 can be configured to cause the coater 31CT to apply the pretreatment agent PCA2 onto the recording medium M from the smallest of the discharge amounts of the pretreatment agent PCA2 for one line, based on the discharge amounts of the pretreatment agents PCA1 and PCA2 for each pixel calculated by the discharge information generation unit 113.

Alternatively, in S1607, the pretreatment apparatus 3 can be configured to cause the coater 31CT to apply the pretreatment agent PCA2 to the recording medium M from the smallest of the discharge amounts in the image area formed according to the drawing data, based on the discharge amounts of the pretreatment agents PCA1 and PCA2 for each pixel calculated by the discharge information generation unit 113.

The DFE 1 described above can be a dedicated device or can be realized by installing predetermined software in a server or a personal computer. Further, the DFE 1 is not necessarily separate from the inkjet apparatus 2 and can be realized by a controller inside the inkjet apparatus 2.

Further, the DFE 1, the printer controller 20C in the inkjet apparatus 2, and the pre-coating controller 30C in the pretreatment apparatus 3 can cooperate to implement the function of the DFE 1. Further, the pretreatment apparatus 3 can be configured to operate via the printer controller 20C without directly communicating with the DFE 1.

Further, in the above-described embodiment, the recording medium M is transported, but aspects of this disclosure are applicable to an apparatus that does not convey the recording medium M. For example, aspects of this disclosure are applicable to a flatbed inkjet apparatus. In the flatbed inkjet apparatus, the recording medium M is placed on a table, and a carriage on which the colorant discharge heads 21 and the pretreatment agent discharge head 31 are mounted moves two-dimensionally to form an image on the recording medium M.

In addition, the above-described pretreatment apparatus 3 is described as an example of an apparatus to discharge a pretreatment agent, but the pretreatment apparatus 3 can perform different pretreatment. For example, pretreatment apparatus 3 can control the amount of plasma discharge from a plasma device based on the output image type information, thereby controlling the manner of pretreatment. In this case, an electrode to perform plasma discharge functions as a pretreatment execution device for performing pretreatment.

The recording medium used for recording is not particularly limited, but plain paper, glossy paper, special paper, cloth, film, overhead projector (OHP) transparency, a general-purpose print sheet, and the like can be used.

Ink

The organic solvent, water, coloring material, resins, and additives for use in the ink are described below.

Resin

The type of the resin contained in the ink has no particular limit and can be suitably selected to suit to a particular application. Examples are urethane resins, polyester resins, acrylic-based resins, vinyl acetate-based resins, styrene-based resins, butadiene-based resins, styrene-butadiene-based resins, vinylchloride-based resins, acrylic styrene-based resins, and acrylic silicone-based resins.

Resin particles made of such resins can be also used. A resin emulsion in which the resin particles are dispersed in water as a dispersion medium can be mixed with materials such as a coloring material and an organic solvent to obtain an ink. A suitably-synthesized resin particle can be used. Alternatively, the resin particle is available on the market. These resin particles can be used alone or in combination.

The volume average particle diameter of the resin particle is not particularly limited and can be suitably selected to suit to a particular application. The volume average particle diameter is preferably from 10 to 1,000 nm, more preferably from 10 to 200 nm, and furthermore preferably from 10 to 100 nm to obtain good fixability and image hardness.

The volume average particle diameter can be measured by using, for example, a particle size analyzer (Nanotrac Wave-UT151, manufactured by MicrotracBEL Corp.).

The proportion of the resin is not particularly limited and can be suitably selected to suit to a particular application. In terms of fixability and storage stability of ink, the proportion of the resin is preferably from 1 to 30 percent by mass and more preferably from 5 to 20 percent by mass to the total amount of the ink.

Coloring Material

The coloring material has no particular limit. For example, pigments and dyes are suitable.

As the pigment, inorganic pigments or organic pigments can be used. These can be used alone or in combination. In addition, a mixed crystal can be used as the pigment.

As the pigments, for example, black pigments, yellow pigments, magenta pigments, cyan pigments, white pigments, green pigments, orange pigments, gloss pigments of gold, silver, etc., and metallic pigments can be used.

As the inorganic pigments, in addition to titanium oxide, iron oxide, calcium carbonate, barium sulfate, aluminum hydroxide, barium yellow, cadmium red, and chrome yellow, carbon black manufactured by known methods such as contact methods, furnace methods, and thermal methods can be used.

Usable as the organic pigments are azo pigments, polycyclic pigments (phthalocyanine pigments, perylene pigments, perinone pigments, anthraquinone pigments, quinacridone pigments, dioxazine pigments, indigo pigments, thioindigo pigments, isoindolinone pigments, and quinophthalone pigments, etc.), dye chelates (basic dye type chelates, acid dye type chelates, etc.), nitro pigments, nitroso pigments, and aniline black can be used. Of those pigments, pigments having good affinity with solvents are preferable. Also, hollow resin particles and hollow inorganic particles can be used.

Specific examples of the pigments for black include, but are not limited to, carbon black (C.I. Pigment Black 7) such as furnace black, lamp black, acetylene black, and channel black, metals such as copper, iron (C.I. Pigment Black 11), and titanium oxide, and organic pigments such as aniline black (C.I. Pigment Black 1).

Specific examples of the pigments for color include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, and 213; C.I. Pigment Orange 5, 13, 16, 17, 36, 43, and 51; C.I. Pigment Red 1, 2, 3, 5, 17, 22, 23, 31, 38, 48:2, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, 254, and 264; C.I. Pigment Violet 1 (Rhodamine Lake), 3, 5:1, 16, 19, 23, and 38; C.I. Pigment Blue 1, 2, 15 (Phthalocyanine Blue), 15:1, 15:2, 15:3, 15:4, (Phthalocyanine Blue), 16, 17:1, 56, 60, and 63; C.I. Pigment Green 1, 4, 7, 8, 10, 17, 18, and 36.

The dye is not particularly limited and includes, for example, acidic dyes, direct dyes, reactive dyes, basic dyes. These can be used alone or in combination.

Specific examples of the dye include, but are not limited to, C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C. I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

The proportion of the coloring material in the ink is preferably from 0.1 to 15 percent by mass and more preferably from 1 to 10 percent by mass in terms of enhancement of image density, fixability, and discharge stability.

To obtain an ink by dispersing a pigment, for example, a hydrophilic functional group is introduced into a pigment to prepare a self-dispersible pigment, the surface of a pigment is coated with a resin followed by dispersion, or a dispersant is used to disperse a pigment.

To prepare a self-dispersible pigment by introducing a hydrophilic functional group into a pigment, for example, a functional group such as sulfone group and carboxyl group can be added to the pigment (e.g., carbon) to disperse the pigment in water.

To coat the surface of a pigment with a resin, the pigment is encapsulated by microcapsules to make the pigment dispersible in water. This can be referred to as a resin-coated pigment. In this case, all the pigments to be added to ink are not necessarily entirely coated with a resin. Pigments partially or wholly uncovered with a resin are allowed to be dispersed in the ink unless such pigments have an adverse impact.

In a method of using a dispersant to disperse a pigment, for example, a known dispersant having a small molecular weight or a large molecular weight, which is represented by a surfactant, is used to disperse the pigment in ink.

Usable as the dispersant is, for example, an anionic surfactant, a cationic surfactant, a nonionic surfactant, an amphoteric surfactant, etc. depending on a pigment.

Also, a nonionic surfactant (RT-100, manufactured by TAKEMOTO OIL & FAT CO., LTD.) and a formalin condensate of naphthalene sodium sulfonate are suitable as the dispersant.

Those can be used alone or in combination.

Pigment Dispersion

The ink can be obtained by mixing a pigment with materials such as water and an organic solvent. The pigment can be mixed with water, a dispersant, etc., to prepare a pigment dispersion and thereafter mix the pigment dispersion with material such as water and an organic solvent to manufacture the ink.

The pigment dispersion is obtained by mixing and dispersing water, a pigment, a pigment dispersant, and other optional components and controlling the particle size. It is good to use a dispersing device for dispersion.

The particle diameter of the pigment in the pigment dispersion has no particular limit. For example, the maximum frequency is preferably from 20 to 500 nm and more preferably from 20 to 150 nm in the maximum number conversion to improve dispersion stability of the pigment and ameliorate discharge stability and the image quality such as image density. The particle diameter of the pigment can be measured using a particle size analyzer (Nanotrac Wave-UT151, manufactured by MicrotracBEL Corp).

In addition, the proportion of the pigment in the pigment dispersion is not particularly limited and can be suitably selected to suit a particular application. In terms of improving discharge stability and image density, the proportion is preferably from 0.1 to 50 percent by mass and more preferably from 0.1 to 30 percent by mass.

It is preferable that the pigment dispersion be filtered with a filter, a centrifuge, etc. to remove coarse particles followed by degassing.

Organic Solvent

There is no specific limitation to the organic solvent for use in the present disclosure. For example, water-soluble organic solvents can be used. Examples are polyols, ethers such as polyol alkylethers and polyol arylethers, nitrogen-containing heterocyclic compounds, amides, amines, and sulfur-containing compounds.

Specific examples of the polyol include, but are not limited to, ethylene glycol, diethylene glycol, 1,2-propanediol, 1,3-propane diol, 1,2-butanediol, 1,3-butanediol, 1,4-butanediol, 2,3-butanediol, 3-methyl1,3-butanediol, trethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butanetriol, 1,2,3-butanetriol, 2,2,4-trimethyl-1,3-pentanediol, and petriol.

Specific examples of the polyol alkyl ethers include, but are not limited to, ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether.

Specific examples of the polyol aryl ethers include, but are not limited to, ethylene glycol monophenyl ether and ethylene glycol monobenzyl ether.

Specific examples of nitrogen-containing heterocyclic compounds include, but are not limited to, 2-pyrolidone, N-methyl-2-pyrolidone, N-hydroxyethyle-2-pyrolidone, 1,3-dimethyl-2-imidazoline, ε-caprolactam, and γ-butylolactone.

Specific examples of the amide include, but are not limited to, formamide, N-methyl formamide, N,N-dimethylformamide, 3-methoxy-N,N-dimethyl propionamide, and 3-buthoxy-N,N-dimethylpropionamide.

Specific examples of the amine include, but are not limited to, monoethanol amine, diethanol amine, and triethyl amine.

Specific examples of the sulfur-containing compounds include, but are not limited to, dimethyl sulphoxide, sulfolane, and thiodiethanol.

Also, for example, propylene carbonate, ethylene carbonate, etc. can be used as the organic solvent.

To serve as a humectant and impart a good drying property, it is preferable to use an organic solvent having a boiling point of 250 degrees C. or lower.

Polyol compounds having eight or more carbon atoms and glycol ether compounds are also suitable. Specific examples of the polyol compounds having eight or more carbon atoms include, but are not limited to, 2-ethyl-1,3-hexanediol and 2,2,4-trimethyl-1,3-pentanediol.

Specific examples of the glycolether compounds include, but are not limited to, polyol alkylethers such as ethyleneglycol monoethylether, ethyleneglycol monobutylether, diethyleneglycol monomethylether, diethyleneglycol monoethylether, diethyleneglycol monobutylether, tetraethyleneglycol monomethylether, and propyleneglycol monoethylether; and polyol arylethers such as ethyleneglycol monophenylether and ethyleneglycol monobenzylether.

The polyol compounds having eight or more carbon atoms and glycolether compounds enhance permeability of ink for paper used as a print medium (recording medium).

The proportion of the organic solvent in the ink has no particular limit and can be suitably selected to suit to a particular application.

In terms of drying property and discharge reliability of ink, the proportion is preferably from 10 to 60 percent by mass and more preferably from 20 to 60 percent by mass.

Water

The proportion of water in the ink is not particularly limited and can be suitably selected to suit to a particular application. For example, in terms of the drying property and discharge reliability of the ink, the proportion is preferably from 10 to 90 percent by mass and more preferably from 20 to 60 percent by mass.

Additive

Ink can further optionally include a surfactant, a defoaming agent, a preservative and fungicide, a corrosion inhibitor, a pH regulator, etc.

Surfactant

Examples of the surfactant are silicone-based surfactants, fluorochemical surfactants, amphoteric surfactants, nonionic surfactants, anionic surfactants, etc.

The silicone-based surfactant has no specific limit and can be suitably selected to suit to a particular application. Of these, silicone-based surfactants not decomposed even at high pH are preferred. The silicone-based surfactants include, for example, side chain-modified polydimethyl siloxane, both distal end-modified polydimethyl siloxane, one distal end-modified polydimethyl siloxane, and side chain both distal end-modified polydimethyl siloxane. As the modification group, it is particularly preferable to select a polyoxyethylene group or polyoxyethylene polyoxypropylene group because these demonstrate good properties as aqueous surfactants. A polyether-modified silicone-based surfactant can be used as the silicone-based surfactant. A specific example is a compound in which a polyalkylene oxide structure is introduced into the side chain of the Si site of dimethyl siloxane.

Specific examples of the fluorochemical surfactants include, but are not limited to, perfluoroalkyl sulfonic acid compounds, perfluoroalkyl carboxylic acid compounds, ester compounds of perfluoroalkyl phosphoric acid, adducts of perfluoroalkyl ethylene oxide, and polyoxyalkylene ether polymer compounds having a perfluoroalkyl ether group in its side chain. These are particularly preferable because of small possibility of foam production. Specific examples of the perfluoroalkyl sulfonic acid compounds include, but are not limited to, a perfluoroalkyl sulfonic acid and a salt of perfluoroalkyl sulfonic acid. Specific examples of the perfluoroalkyl carboxylic acid compounds include, but are not limited to, a perfluoroalkyl carboxylic acid and a salt of perfluoroalkyl carboxylic acid. Specific examples of the polyoxyalkylene ether polymer compounds having a perfluoroalkyl ether group in its side chain include, but are not limited to, sulfuric acid ester salts of polyoxyalkylene ether polymer having a perfluoroalkyl ether group in its side chain, and salts of polyoxyalkylene ether polymers having a perfluoroalkyl ether group in its side chain. Counter ions of salts in these fluorochemical surfactants are, for example, Li, Na, K, $NH_4$, $NH_3CH_2CH_2OH$, $NH_2(CH_2CH_2OH)_2$, and $NH(CH_2CH_2OH)_3$.

Specific examples of the amphoteric surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides.

Specific examples of the anionic surfactants include, but are not limited to, polyoxyethylene alkyl ether acetates, dodecyl benzene sulfonates, laurates, and polyoxyethylene alkyl ether sulfates.

These can be used alone or in combination.

The silicone-based surfactant has no particular limit and can be suitably selected to suit to a particular application. Specific examples include, but are not limited to, side-chain-modified polydimethyl siloxane, both distal-end-modified polydimethylsiloxane, one-distal-end-modified polydimethylsiloxane, and side-chain-both-distal-end-modified polydimethylsiloxane. In particular, a polyether-modified silicone-based surfactant having a polyoxyethylene group or a polyoxyethylene polyoxypropylene group is particularly preferable because such a surfactant demonstrates good property as an aqueous surfactant.

Any suitably synthesized surfactant and any product available on the market is suitable. Products available on the market can be obtained from Byc Chemie Japan Co., Ltd., Shin-Etsu Silicone Co., Ltd., Dow Corning Toray Co., Ltd., etc., NIHON EMULSION Co., Ltd., Kyoeisha Chemical Co., Ltd., etc.

The polyether-modified silicon-based surfactant has no particular limit and can be suitably selected to suit to a particular application. For example, a compound is usable in which the polyalkylene oxide structure represented by the following Chemical formula S-1 is introduced into the side chain of the Si site of dimethyl polysiloxane.

Chemical Formula S-1

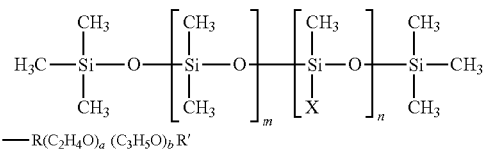

$X = $ —$R(C_2H_4O)_a (C_3H_5O)_b R'$

In the Chemical formula S-1, "m", "n", "a", and "b" each, respectively independently represent integers, R represents an alkylene group, and R' represents an alkyl group.

Specific examples of polyether-modified silicone-based surfactants include, but are not limited to, KF-618, KF-642, and KF-643 (all manufactured by Shin-Etsu Chemical Co., Ltd.), EMALEX-SS-5602 and SS-1906EX (both manufactured by NIHON EMULSION Co., Ltd.), FZ-2105, FZ-2118, FZ-2154, FZ-2161, FZ-2162, FZ-2163, and FZ-2164 (all manufactured by Dow Corning Toray Co., Ltd.), BYK-33 and BYK-387 (both manufactured by BYK Japan KK.), and TSF4440, TSF4452, and TSF4453 (all manufactured by Momentive Performance Materials Inc.).

The fluorochemical surfactant is preferably a fluorine-substituted compound having 2 to 16 carbon atoms and more preferably a fluorine-substituted compound having 4 to 16 carbon atoms.

Specific examples of the fluorochemical surfactants include, but are not limited to, perfluoroalkyl phosphoric acid ester compounds, adducts of perfluoroalkyl ethylene oxide, and polyoxyalkylene ether polymer compounds having a perfluoroalkyl ether group in its side chain. Of these, polyoxyalkylene ether polymer compounds having a perfluoroalkyl ether group in its side chain are preferable because such polyoxyalkylene ether polymer compounds do not easily foam and the fluorosurfactant represented by the following Chemical formula F-1 or Chemical formula F-2.

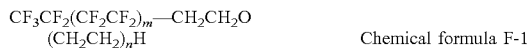

Chemical formula F-1

In the compound represented by Chemical formula F-1, m is preferably 0 or an integer of from 1 to 10 and n is preferably 0 or an integer of from 1 to 40.

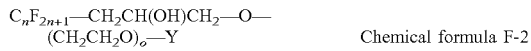

Chemical formula F-2

In the compound represented by the chemical formula F-2, Y represents H or $C_mF_{2m+1}$, where m represents an integer of from 1 to 6, or $CH_2CH(OH)CH_2-C_mF_{2m+1}$, where m represents an integer of from 4 to 6, or $C_pH_{2p+1}$, where p is an integer of from 1 to 19. n represents an integer of from 1 to 6. a represents an integer of from 4 to 14.

As the fluorochemical surfactant, products available on the market can be used. Specific examples include, but are not limited to, SURFLON S-111, SURFLON S-112, SURFLON S-113, SURFLON S-121, SURFLON S-131, SURFLON S-132, SURFLON S-141, and SURFLON S-145 (all manufactured by ASAHI GLASS CO., LTD.); FLUORAD FC-93, FC-95, FC-98, FC-129, FC-135, FC-170C, FC-430, and FC-431 (all manufactured by SUMITOMO 3M); MEGAFACE F-470, F-1405, and F-474 (all manufactured by DIC CORPORATION); ZONYL TBS, FSP, FSA, FSN-100, FSN, FSO-100, FSO, FS-300, UR, and Capstone™ FS-30, FS-31, FS-3100, FS-34, and FS-35 (all manufactured by The Chemours Company); FT-110, FT-250, FT-251, FT-400S, FT-150, and FT-400SW (all manufactured by NEOS COMPANY LIMITED); POLYFOX PF-136A, PF-156A, PF-151N, PF-154, and PF-159 (manufactured by OMNOVA SOLUTIONS INC.); and UNIDYNE™ DSN-403N (manufactured by DAIKIN INDUSTRIES, Ltd.). Of these, in terms of improvement on print quality, in particular coloring property and permeability, wettability, and uniform dying property on paper, FS-3100, FS-34, and FS-300 of The Chemours Company, FT-110, FT-250, FT-251, FT-400S, FT-150, and FT-400SW of NEOS COMPANY LIMITED, POLYFOX PF-151N of OMNOVA SOLUTIONS INC., and UNIDYNE™ DSN-403N (manufactured by DAIKIN INDUSTRIES, Ltd.) are particularly preferable.

The proportion of the surfactant in ink is not particularly limited and can be suitably selected to suit to a particular application. For example, the proportion of the surfactant is preferably from 0.001 to 5 percent by mass and more preferably from 0.05 to 5 percent by mass in terms of excellent wettability and discharge stability and improvement on image quality.

Defoaming Agent

The defoaming agent has no particular limit. For example, silicon-based defoaming agents, polyether-based defoaming agents, and aliphatic acid ester-based defoaming agents are suitable. These can be used alone or in combination. Of these, silicone-based defoaming agents are preferable in terms of the effect of foam breaking.

Preservatives and Fungicides

The preservatives and fungicides are not particularly limited. A specific example is 1,2-benzisothiazoline-3-one.

Corrosion Inhibitor

The corrosion inhibitor has no particular limitation. Specific examples include, but are not limited to, acid sulfites and sodium thiosulfates.

pH Regulator

The pH regulator has no particular limit as long as the pH regulator can control pH to not lower than 7. Specific examples include, but are not limited to, amines such as diethanol amine and triethanol amine.

Property of Ink

Properties of the ink are not particularly limited and can be suitably selected to suit to a particular application. For example, viscosity, surface tension, pH, etc, are preferable in the following ranges.

Viscosity of the ink at 25 degrees C. is preferably from 5 to 30 mPa·s and more preferably from 5 to 25 mPa·s to improve print density and text quality and obtain good dischargeability. Viscosity can be measured by, for example, a rotatory viscometer (RE-80L, manufactured by TOKI SANGYO CO., LTD.). The measuring conditions are as follows:

Standard cone rotor (1°34'×R24);
Sample liquid amount: 1.2 mL;
Number of rotations: 50 rotations per minute (rpm);
25 degrees C.; and
Measuring time: three minutes.

The surface tension of the ink is preferably 35 mN/m or less and more preferably 32 mN/m or less at 25 degrees C. in terms that the ink is preferably and suitably leveled on a recording medium and the drying time of the ink is shortened. pH of the ink is preferably from 7 to 12 and more preferably from 8 to 11 in terms of prevention of corrosion of metal material in contact with liquid.

Pretreatment Agent

The pretreatment agent contains, for example, a multivalent metal salt, an organic solvent, a cationic polymer, water, etc., and serves as a flocculant. In addition, pretreatment agent contain can contain a surfactant, a defoaming agent, a pH regulator, a preservatives and fungicides, a corrosion inhibitor, etc. The organic solvent, the surfactant, the defoaming agent, the pH regulator, the preservatives and fungicides, and the corrosion inhibitor can be the same material as articles for use in the ink. Also, other materials for use in known processing fluid can be used.

Although discharging a pretreatment agent serving as a coagulant from an inkjet head causes a defective discharge problem due to mist adherence and nozzle clogging, good discharge stability is obtained in the present embodiment. Also, while reducing defective discharge ascribable to precipitation of a multivalent metal salt in a pretreatment agent, collapse of dot formation formed with ink applied to an area to which a liquid composition is applied can be prevented, so that defective images are not easily produced.

Multivalent Metal Salt

Examples of the multivalent metal salt are articles constituted of particular multivalent metal salt ions and anionic ions bonded with these multivalent metal salts.

Examples of the metal salt include a calcium salt, a magnesium salt, a nickel salt, an aluminum salt, a boron salt, a zinc salt, etc. Of these, a calcium salt and a magnesium salt are preferable. Of these, a magnesium salt is particularly preferable. However, the multivalent metal salt is not limited thereto. Other combinations with other metal salts are possible.

Of the examples of the inorganic metal salt, specific examples of the calcium salt and the magnesium salt include, but are not limited to, calcium chloride, magnesium chloride, calcium bromide, magnesium bromide, calcium nitrate, magnesium nitrate, and magnesium sulfate.

Organic acid metal salt can be used in addition to the multivalent metal salt

Specific examples of the organic acid metal salt include, but are not limited to, pantothenic acid, propionic acid, ascorbic acid, acetic acid, calcium salt of lactic acid, and magnesium salt.

The amount of the multivalent metal salt in the pretreatment agent preferably satisfies the relation with the amount of the betaine compound and glycerin, which is described later.

Properties of Pretreatment Agent

The pretreatment agent preferably has a 15 ms dynamic surface tension of from 35 to 65 mN/m. When the 15 ms dynamic surface tension is 35 mN/m or more, the trailing (ligament length) of a droplet at the time of discharge can be shortened, so that a pretreatment agent can become a target droplet before landing, thereby reducing dot collapse at the time of landing. Further, since mist caused by trailing-off is reduced, contamination of a nozzle surface due to the mist can be reduced, thereby reducing non-discharge. Also, when the 15 ms dynamic surface tension is 65 mN/m or less, the occurrence of satellites can be reduced, thereby reducing mist contamination and non-discharge.

The pretreatment agent preferably has a static surface tension of from 20 to 35 mN/m. When the static surface tension is 20 mN/m or more, the pretreatment agent can maintain the meniscus of a nozzle, so that occurrence of non-discharge ascribable to liquid overflowing can be reduced. Further, when the static surface tension is 35 mN/m or less, the discharge power is stabilized not affected by the meniscus maintenance power, to attain stable discharge of the pretreatment. This is because, unlike a non-Newtonian fluid containing a solid amount such as ink, strong shearing at discharge does not change viscosity of the pretreatment agent. Therefore, this range is preferable.

Betaine Compound

The pretreatment agent preferably contains a multivalent metal salt, glycerin, and a betaine compound having a molecular weight of from 100 to 200, and the mass ratio of the total amount of glycerin and the betaine compound to the amount of the multivalent metal salt is preferably in the range of from 1.05 to 2.50.

As the solvent dissolving the metal salt in the pretreatment agent evaporates, the multivalent metal precipitates. When discharging the pre-treatment agent from an inkjet head decapped and left undone, precipitation thereof causes defective discharge. On the other hand, in the case of a pretreatment agent containing glycerin, an ink is applied to a recording medium where a large amount of glycerin remains. Therefore, the coloring material in the applied ink wet-spreads, which leads to granularity degradation caused by partial dot collapse.

Inclusion of a betaine compound enhances moisture retention of the pretreatment agent, so that good discharge stability is obtained and granularity is enhanced, which contributes to production of good images. Further, since the mass ratio of the total amount of glycerin and the betaine compound to the amount of the multivalent metal salt is from 1.05 to 2.50, good discharge stability can be obtained and granularity is enhanced, which contributes to production of good images.

The mass ratio of the total amount of glycerin and the betaine compound to the amount of the multivalent metal salt is preferably from 1.05 to 1.40. In this range, good discharge stability can be obtained and granularity is enhanced, which contributes to production of good images.

The mass ratio of the betaine compound to the total amount of glycerin and the betaine compound is preferably from 0.1 to 0.5. In this range, good discharge stability can be obtained and granularity is enhanced, which contributes to production of good images.

The betaine compound can be suitably selected. Specific examples include, but are not limited to, trimethylglycine (glycine betaine, molecular weight of 117), carnitine (molecular weight of 161), γ-butyrobetaine (molecular weight of 145), homarine (molecular weight of 137), trigonerine (molecular weight of 137), homoserine betaine (molecular weight of 161), valine betaine (molecular weight of 159), lysine betaine (molecular weight of 188), ornithine betaine (molecular weight of 176), alanine betaine (molecular weight of 117), stakidrine (proline betaine, molecular weight of 185), and glutamic acid betaine (molecular weight of 189). Of these, betaine compounds having a molecular weight of from 100 to 200 are preferable. When the molecular weight is from 100 to 200, ink permeability on paper surface can be enhanced, and the granularity can be improved.

EXAMPLES

The present disclosure is described in detail with reference to Examples but are not limited to the following Examples.

Examples 1 to 5

Preparation Example of Pretreatment Agent pretreatment agents 1 to 5 were prepared according to the formulations presented in Table 1.

Capstone-FS 34 in Table 1 was manufactured by The Chemours Company.

Dynamic Surface Tension

Dynamic surface tension of each pretreatment agent was measured under the conditions of a temperature of 25 degrees C., bubble lifetimes of 15 msec, 150 msec, 1500 msec using a portable surface tensiometer (SITA DynoTester, manufactured by EKO Instruments).

Static Surface Tension

Static surface tension of each pretreatment agent was measured under the condition of a temperature of 25 degrees C. using a surface tensiometer (DY 300, manufactured by Kyowa Interface Co., Ltd.).

Discharge Stability

A solid image was continuously printed on 250 sheets of inkjet gloss paper using GXe 5500 filled with each pretreatment agent and streaks/voids/jetting disturbance on the solid image area was visually confirmed and evaluated. Since the pretreatment agent was colorless, 0.005 percent FB aqueous solution (blue No. 1, FB manufactured by Daiwa Dyestuff Mfg. Co., Ltd.) was added in an amount of 0.1 percent to dye the pretreatment agent for visual confirmation. A and B are acceptable in the following evaluation criteria.

Evaluation Criteria

A: None of streaks, no voids, no jetting disturbance observed in solid portion

B: Slight streaks, voids, and jetting disturbance observed in solid portion

C: Streaks, voids, and jetting disturbance observed in solid portion in a half number of solid images D: Streaks, voids, and jetting disturbance observed all over solid portion Overflow to Nozzle Surface A solid image was continuously printed on 250 sheets of inkjet gloss paper using GXe 5500 filled with each pretreatment agent to visually confirm the state of the nozzle surface and evaluate liquid overflow and contamination of the nozzle surface. A and B are acceptable in the following evaluation criteria.

Evaluation Criteria

A: No liquid overflow to nozzle surface (nozzle position not recognized)

B: Liquid slightly scattered on nozzle surface (nozzle position not recognized, but droplet adhered)

C: Liquid scattered on nozzle surface (liquid overflown around nozzle, and nozzle position visually recognized)

D: Liquid scattered on nozzle surface, and liquid pool clearly recognized

The composition and evaluation results of the pretreatment agent were presented in Table 1. In Table 1, percent means percent by mass.

with nitrogen during stirring. Maintaining the inside of the reaction container in nitrogen atmosphere, the system was heated to 80 degrees C. Thereafter, a liquid mixture of 75.0 g of methacrylic acid-2-hydroxyethyl, 77.0 g of methacrylic acid, 80.0 g of styrene, 150.0 g of butylmethacrylate, 98.0 g of butylacrylate, 20.0 g of methylmethacrylate, and 40.0 g of PERBUTYL® O (manufactured by NOF CORPORATION) was dripped in four hours by the dripping instrument. After dripping, the system was allowed to continue reaction at the same temperature for 15 hours to obtain a methylethyl ketone solution of styrene having an anionic functional group-acrylic-based copolymer A having an acid value of 100 mg KOH/g, a weight average molecular weight of 21,000, and a glass transition temperature (Tg, calculated) of 31 degrees C. After the completion of the reaction, methy-

TABLE 1

| | | | Example | | | | |
|---|---|---|---|---|---|---|---|
| | | | 1 | 2 | 3 | 4 | 5 |
| | | | | | pretreatment agent | | |
| | | | 1 | 2 | 3 | 4 | 5 |
| Magnesium sulfate (metal salt) | | | 20.00 percent | | 25.00 percent | 25.00 percent | 20.00 percent |
| Ammonium nitrate | | | | 20.00 percent | | 25.00 percent | |
| Glycerin | | | 20.00 percent | 20.00 percent | 25.00 percent | 10.00 percent | 20.00 percent |
| 1,2-propanediol | | | | | 5.00 percent | | |
| 1,2-butane diol | | | | 6.00 percent | | | 6.00 percent |
| 1,3-propanediol | | | | | | 6.00 percent | |
| 1,3-butane diol | | | | | | | 6.00 percent |
| 1,5-pentane diol | | | 4.00 percent | | | | |
| Octane diol | | | 0.50 percent | 1.00 percent | 1.00 percent | 1.50 percent | 2.50 percent |
| LS-106 | | | | 0.05 percent | 0.10 percent | | |
| Capstone FS-34 | | | 0.05 percent | | | 0.30 percent | 0.05 percent |
| Highly pure water | | | Balance | Balance | Balance | Balance | Balance |
| Properties | Viscosity | (mPa · s) | 4.9 | 5.8 | 4.4 | 7.9 | 8.6 |
| | pH | [−] | 8.5 | 9.2 | 9.3 | 9.1 | 9.1 |
| | Conductivity | [S/m] | 4.25 | 1.87 | 2.07 | 1.46 | 1.45 |
| | Dynamic surface tension | 15 ms (mN/m) | 62.1 | 58.1 | 58.4 | 52.5 | 38.4 |
| | | 150 ms (mN/m) | 56.8 | 51.7 | 52.6 | 46.7 | 32.7 |
| | | 1,500 ms (mN/m) | 54.1 | 49.8 | 51.1 | 45.0 | 32.0 |
| | Static surface tension | (mN/m) | 32.2 | 30.8 | 25.3 | 20.8 | 30.6 |
| | Density | [g/cm$^3$] | 1.20 | 1.19 | 1.17 | 1.18 | 1.19 |
| Evaluation | Discharge stability of first coating liquid | | A | A | A | B | B |
| | Overflow state of nozzle surface | | A | A | B | B | A |

Examples 6 to 15

Synthesis Example of Copolymer A 550 g of methylethyl ketone was loaded in the reaction container of an automatic polymerization reactor (polymerization tester DSL-2AS type, available from TODOROKI SANGYO CO., LTD.) equipped with a stirrer, a dripping instrument, a temperature sensor, and a reflux instrument equipped with a nitrogen gas introducing device at its upper part, and the inside of the reaction container was replaced lethyl ketone was partially distilled away under a reduced pressure to obtain Copolymer A solution in which the non-volatile portion was adjusted to 50 percent.

Preparation Example of Pigment Dispersion

Preparation of Pigment Dispersion 1

1,000 g of carbon black (Raven 1080, available from Colombian Carbon Japan Co.), 800 g of Copolymer A solution, 143 g of 10 percent sodium hydroxide aqueous solution, 100 g of methylethyl ketone, and 1,957 g of water were loaded in a mixing tank equipped with a jacket for cooling and stirred and mixed. The liquid mixture was dispersed by a dispersion device (SC mill SC100, manufactured by Mitsui Mining Company) filled with zirconia beads having a diameter of 0.3 mm for six hours in a circulation manner (liquid dispersion out of the dispersion device returned to the mixing tank). The number of rotation of the dispersion device was 2,700 rotations per minute (rpm), and cold water was caused to pass through the jacket for cooling to keep the temperatures of the liquid dispersion at 40 degrees C. or lower.

After the completion of dispersion, raw liquid dispersion was extracted from the mixing tank, and the mixing tank and the flow paths in the dispersion device were rinsed with 10,000 g of water. The liquid after rinsing and the raw liquid dispersion were mixed to obtain a diluted liquid dispersion. The diluted liquid dispersion was placed in a glass distillator to distill away all of methylethyl ketone and a part of water. After the system was cooled down to room temperature, 10 percent hydrochloric acid was dripped to the distillator to control pH to 4.5 during stirring. Thereafter, the solid portion was filtrated and rinsed with water by Nutsche filtration equipment (pressure filtration equipment, manufactured by Japan Chemical Engineering & Machinery Co, Ltd.). The thus-obtained cake was taken to a vessel. 200 g of 20 percent potassium hydroxide aqueous solution was added thereto. Thereafter, the resultant was dispersed by a dispersion device (TK homodisper, manufactured by PRIMIX Corporation). Moreover, water was added thereto to adjust the non-volatile portion to obtain Pigment dispersion 1 dispersed in an aqueous medium as a complex particle in which carbon black having a non-volatile portion in an amount of 20 percent by mass was covered with a styrene-acrylic-based copolymer having a carboxyl group neutralized in potassium hydroxide.

Preparation Example of Ink

Preparation of Ink 1

22.0 percent by mass glycerin, 11.0 percent by mass 1,3-butane diol, 2.0 percent by mass 1,3-octane diol, 2.0 percent by mass surfactant (E1010, manufactured by Nisshin Chemical Co., Ltd.), 1.1 percent by mass 2,4,7,9-tetramethyldecane7-diol, 0.1 percent by mass PROXEL LV (manufactured by AVECIA GROUP), 0.5 percent by mass 2-amino-2methyl-1,3-propanediol, and deionized water were uniformly mixed by stirring for one hour. Thereafter, 2.0 percent by mass rosin-modified maleic acid resin (Harimac R-100, manufactured by Harima Chemicals Group, Inc.) was added thereto followed by uniform mixing by stirring for one hour. Thereafter, Pigment dispersion 1 was added in such a manner that the solid mass was 8.0 percent by mass followed by uniform mixing by stirring for one hour. The thus-obtained mixture was pressure-filtrated with a polyvinylidene fluoride membrane filter having an average opening diameter of 0.8 m to remove coarse particles and dust to obtain Ink 1.

The composition of Ink 1 is presented in Table 2. The values in Table 2 are represented in percent by mass.

TABLE 2

|  |  | Ink 1 |
|---|---|---|
| Organic solvent | Glycerin | 22.0 |
|  | 1,3-Butane diol | 11.0 |
|  | 1,3-Octane diol | 2.0 |
| Coloring material | Aqueous pigment dispersion 1 (solid mass) | 8.0 |
| Resin | Rosin-modified maleic acid resin Halimac R-100 (manufactured by Harima Chemicals, Inc.) | 2.0 |
| Surfactant | Product name: E1010 (manufactured by Nisshin Chemical Industry Co., Ltd.) | 2.0 |
| Foam inhibitor | 2,4,7,9-tetramethyldecane-4,7-diol | 1.1 |
| Antibacterial Agent | PROXEL LV | 0.1 |
| pH regulator | 2-amino-2-ethyl-1,3-propane diol | 0.5 |
| Water | Deionized water | Balance |
| Total (Percent by mass) |  | 100.0 |

Preparation of Pretreatment Agent 6

22.2 percent by mass glycerin, 24.6 percent by mass magnesium sulfate heptahydrate (manufactured by Showa Chemical Industry Co., Ltd.), 7.4 percent by mass betaine compound (L-carnitine, 0.4 percent by mass polyoxyalkylene alkyl ether (EMULGEN 103, manufactured by Kao Corporation), 0.1 percent by mass Proxel LV (manufactured by Avecia Ltd.), and 0.1 percent by mass benzotriazole were added and stirred for one hour and uniformly mixed. Further, 1.2 percent by mass N-octyl-2-pyrrolidone was added. Thereafter, deionized water was added to make the total 100 percent by mass, followed by stirring for one hour and homogeneously mixing to prepare Pretreatment agent 1 as a liquid composition was obtained.

Preparation of Pretreatment Agents 7 to 15

Examples 6 to 15 were obtained in the same manner as in the preparation of Pretreatment agent 6, except that the compositions were changed as presented in the following Table 3.

The values in Table 3 are represented in percent by mass. The amount (proportion) of the multivalent metal salts in Table 3 includes hydrated water contained therein. The amount (proportion) of the multivalent metal salts for use in the calculation of (glycerin+betaine compound)/multivalent metal salt in Table 3 includes the amount (proportion) of hydrated water contained therein.

In Table 3, the product names and the manufacturing companies of the ingredients are as follows:

Magnesium nitrate heptahydrate (manufactured by Showa Chemical Industry Co., Ltd.)

Magnesium nitrate hexahydrate (manufactured by Showa Chemical Industry Co., Ltd.)

Evaluation

Next, using the pretreatment agents 6 to 15 and the ink 1, granularity and precipitation property were evaluated according to the following methods and evaluation criteria.

Granularity

The pretreatment agent was discharged onto a recording medium, which was not subject to heat drying treatment. Thereafter, an image forming apparatus (IPSIO GXe 5500, manufactured by Ricoh Company, Ltd.) discharged the ink to the recording medium to obtain a print sample. As the print chart, a 3 cm square gradation image formed with a dot pattern was used.

Next, the 3 cm square gradation image formed with a dot pattern was visually observed, and granularity was evaluated based on the following evaluation criteria. B and above in the following evaluation criteria were evaluated as practicable.

Evaluation Criteria

A: No deterioration of granularity observed (dots are not collapsed)

B: Granularity slightly deteriorate (most dots are not collapsed)

C: Deterioration of granularity visually clearly observed (most dots are broken)

Discharge Stability

The head of GXe 5500 was filled with the pretreatment agent and left in an environment of 23 degrees C. and 50 percent humidity for three days while the head was decapped. Thereafter, a solid image was printed on an inkjet gloss sheet to evaluate the presence or absence of streaks/voids/jetting disturbance by visual confirmation based on the following evaluation criteria. Since the pretreatment agent was colorless, 0.005 percent FB aqueous solution was added in an amount of 0.1 percent to dye the pretreatment agent for the visual confirmation. A and B are acceptable in the following evaluation criteria. When observing the nozzle rated as C after discharging, a number of nozzles were clogged by precipitates.

Evaluation Criteria

A: None of streaks, voids, or jetting disturbance observed in solid portion

B: Slight streaks, voids, and jetting disturbance observed in solid portion

C: Streaks, voids, and jetting disturbance observed in a half number of solid images The composition and evaluation results of the pretreatment agents were presented in Table 3.

TABLE 3

| | | Example | | | | |
|---|---|---|---|---|---|---|
| | | 6 | 7 | 8 | 9 | 10 |
| | | Pretreatment Agent | | | | |
| | | 6 | 7 | 8 | 9 | 10 |
| Betaine compound | L-carnitine (molecular weight of 161) | 7.4 | 7.5 | | 6.5 | 8.6 |
| | Trimethylglycine (molecular weight of 117) | | | 7.4 | | |
| Glycerin | | 22.2 | 22.5 | 22.2 | 19.4 | 25.9 |
| Multivalent metal salt | Magnesium sulfate heptahydrate | 24.6 | | 24.6 | 24.6 | 24.6 |
| | Magnesium nitrate hexahydrate | | 25.6 | | | |
| Surfactant | Polyoxyalkylene alkyl ether | 0.4 | 0.4 | 0.4 | 0.4 | 0.4 |
| Foam inhibitor | N-Octyl-2-pyrroridone | 1.2 | 1.2 | 1.2 | 1.2 | 1.2 |
| Antibacterial agent | PROXEL LV | 0.1 | 0.1 | 0.1 | 0.1 | 0.1 |
| Corrosion inhibitor | Benzotriazoles | 0.1 | 0.1 | 0.1 | 0.1 | 0.1 |
| Water | Deionized water | 44.0 | 42.6 | 44.0 | 47.7 | 39.1 |
| Total (Percent by mass) | | 100.0 | 100.0 | 100.0 | 100.0 | 100.0 |
| Concentration (mol/kg) of multivalent metal salt | | 1.00 | 1.00 | 1.00 | 1.00 | 1.00 |
| Betaine compound/(glycerin + betaine compound) | | 0.25 | 0.25 | 0.25 | 0.25 | 0.25 |
| (Glycerin + betaine compound)/multivalent metal salt | | 1.20 | 1.17 | 1.20 | 1.05 | 1.40 |
| Granularity | | A | A | A | A | A |
| Discharge stability | | A | A | A | B | A |

| | | Example | | | | |
|---|---|---|---|---|---|---|
| | | 11 | 12 | 13 | 14 | 15 |
| | | Pretreatment Agent | | | | |
| | | 11 | 12 | 13 | 14 | 15 |
| Betaine compound | L-carnitine (molecular weight of 161) | 15.4 | 3.0 | 14.8 | 2.7 | 17.7 |
| | Trimethylglycine (molecular weight of 117) | | | | | |
| Glycerin | | 46.2 | 26.6 | 14.8 | 26.9 | 11.8 |
| Multivalent metal salt | Magnesium sulfate heptahydrate | 24.6 | 24.6 | 24.6 | 24.6 | 24.6 |
| | Magnesium nitrate hexahydrate | | | | | |
| Surfactant | Polyoxyalkylene alkyl ether | 0.4 | 0.4 | 0.4 | 0.4 | 0.4 |
| Foam inhibitor | N-Octyl-2-pyrroridone | 1.2 | 1.2 | 1.2 | 1.2 | 1.2 |
| Antibacterial agent | PROXEL LV | 0.1 | 0.1 | 0.1 | 0.1 | 0.1 |
| Corrosion inhibitor | Benzotriazoles | 0.1 | 0.1 | 0.1 | 0.1 | 0.1 |
| Water | Deionized water | 12.0 | 44.0 | 44.0 | 44.0 | 44.0 |
| Total (Percent by mass) | | 100.0 | 100.0 | 100.0 | 100.0 | 100.0 |
| Concentration (mol/kg) of multivalent metal salt | | 1.00 | 1.00 | 1.00 | 1.00 | 1.00 |
| Betaine compound/(glycerin + betaine compound) | | 0.25 | 0.10 | 0.50 | 0.09 | 0.60 |
| (Glycerin + betaine compound)/multivalent metal salt | | 2.50 | 1.20 | 1.20 | 1.20 | 1.20 |
| Granularity | | B | A | A | B | A |
| Discharge stability | | A | A | A | A | B |

The above-described embodiments are illustrative and do not limit the present invention. Thus, numerous additional modifications and variations are possible in light of the above teachings. For example, elements and/or features of different illustrative embodiments can be combined with each other and/or substituted for each other within the scope of the present invention.

Any one of the above-described operations can be performed in various other ways, for example, in an order different from the one described above.

At least a portion of the above-described methods according to embodiments can be implemented by a program stored in non-transitory storage media. Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A liquid discharge system comprising:
a pretreatment execution device configured to apply one of multiple types of pretreatment agents having different levels of aggregating agent concentration on a medium;
a liquid discharge head configured to discharge liquid onto the medium based on image information on an image to be output; and
circuitry configured to analyze the image information to determine whether an area of printing on the medium includes a photograph printing area or a line printing area, and to determine whether a dot to be applied to a dot location on the medium by the liquid discharge head belongs to the photograph printing area or the line printing area,
the circuitry configured, in response to determining the dot belongs to the photographic printing area, to direct the pretreatment execution device to apply, at the dot location, pretreatment agent having a first aggregating agent concentration that causes a diameter of the dot to increase and a color density of the dot to be thicker toward a center of the dot, and
the circuitry configured, in response to determining the dot belongs to the line printing area, to direct the pretreatment execution device to apply, at the dot location, pretreatment agent having a second aggregating agent concentration that causes a diameter of the dot to decrease and the color density of the dot to be uniform.

2. The liquid discharge system according to claim 1, wherein the circuitry is configured to control a concentration of a reactant in the pretreatment agent applied to the medium.

3. The liquid discharge system according to claim 1, wherein the circuitry is configured to control the pretreatment execution device to increase a speed of spreading of wetting of the liquid applied onto the medium, based on the image information.

4. The liquid discharge system according to claim 1, wherein the circuitry is configured to control the pretreatment execution device to reduce a speed of spreading of wetting of the liquid applied onto the medium, based on the image information.

5. The liquid discharge system according to claim 1, wherein the circuitry is configured to control an ink dot profile, including a size and color density, with a concentration of a reactant in the pretreatment agent.

6. The liquid discharge system according to claim 1, wherein the image information includes image type information indicating an image type of the image to be output, the image type being one of letter, photograph, and table, and
wherein the circuitry is configured to control the manner of the pretreatment based on the image type information.

7. The liquid discharge system according to claim 1, wherein the liquid discharged by the liquid discharge head contains a colorant, and
wherein, as the pretreatment, the pretreatment execution device is configured to perform a process to change a dispersion state of the colorant contained in the liquid applied onto the medium for controlling a behavior of the liquid.

8. The liquid discharge system according to claim 1, further comprising an image type determiner configured to determine an image type of the image to be output, the image type being one of letter, photograph, and table,
wherein the circuitry is configured to control the manner of the pretreatment in accordance with the image type determined by the image type determiner.

9. The liquid discharge system according to claim 1, wherein the pretreatment agent has a 15 ms dynamic surface tension of from 35 to 65 mN/m.

10. The liquid discharge system according to claim 1, wherein the pretreatment agent has a static surface tension of from 20 to 35 mN/m.

11. The liquid discharge system according to claim 1, wherein the pretreatment agent contains a multivalent metal salt, glycerin, and a betaine compound having a molecular weight of from 100 to 200, and
wherein a mass ratio of a total amount of the glycerin and the betaine compound to an amount of the multivalent metal salt is from 1.05 to 2.50.

12. The liquid discharge system according to claim 11, wherein the mass ratio is from 1.05 to 1.40.

13. The liquid discharge system according to claim 11, wherein a mass ratio of an amount of the betaine compound to the total amount of the glycerin and the betaine compound is from 0.1 to 0.5.

14. An image forming apparatus comprising:
a pretreatment execution device to apply one of multiple types of pretreatment agents having different levels of aggregating agent concentration on a medium;
a liquid discharge head to discharge liquid onto the medium based on image information on an image to be output; and
circuitry configured to analyze the image information to determine whether an area of printing on the medium includes a photograph printing area or a line printing area, and to determine whether a dot to be applied to a dot location on the medium by the liquid discharge head belongs to the photograph printing area or the line printing area,
the circuitry configured, in response to determining the dot belongs to the photographic printing area, to direct the pretreatment execution device to apply, at the dot location, pretreatment agent having a first aggregating agent concentration that causes a diameter of the dot to increase and a color density of the dot to be thicker toward a center of the dot; and the circuitry configured, in response to determining the dot belongs to the line printing area, to direct the pretreatment execution device to apply, at the dot location, pretreatment agent having a second aggregating agent concentration that causes a diameter of the dot to decrease and the color density of the dot to be uniform.

15. A liquid discharge method comprising:

applying one of multiple types of pretreatment agents having different levels of aggregating agent concentration on a medium;

discharging liquid onto the medium based on the image information;

analyzing the image information to determine whether an area of printing on the medium includes a photograph printing area or a line printing area;

determining whether a dot to be applied to a dot location on the medium by the liquid discharge head belongs to the photograph printing area or the line printing area;

in response to determining the dot belongs to the photographic printing area, applying at the dot location pretreatment agent having a first aggregating agent concentration that causes a diameter of the dot to increase and a color density of the dot to be thicker toward a center of the dot; and in response to determining the dot belongs to the line printing area, applying at the dot location pretreatment agent having a second aggregating agent concentration that causes a diameter of the dot to decrease and the color density of the dot to be uniform.

* * * * *